(12) United States Patent
Mizobata et al.

(10) Patent No.: US 11,565,625 B2
(45) Date of Patent: Jan. 31, 2023

(54) VEHICLE IN-CABIN LIGHTING SYSTEM, METHOD FOR ACTUATING VEHICLE IN-CABIN LIGHTING SYSTEM, AND STORAGE MEDIUM

(71) Applicant: TOYOTA JIDOSHA KABUSHIKI KAISHA, Aichi-ken (JP)

(72) Inventors: Hiroshi Mizobata, Seto (JP); Kazuma Uchibori, Kasugai (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/147,459

(22) Filed: Jan. 13, 2021

(65) Prior Publication Data

US 2021/0245657 A1 Aug. 12, 2021

(30) Foreign Application Priority Data

Feb. 7, 2020 (JP) .............................. JP2020-020145

(51) Int. Cl.
*B60Q 3/80* (2017.01)
*B60Q 3/74* (2017.01)
*H05B 47/105* (2020.01)

(52) U.S. Cl.
CPC ................. *B60Q 3/80* (2017.02); *B60Q 3/74* (2017.02); *H05B 47/105* (2020.01)

(58) Field of Classification Search
CPC ... B60Q 3/80; B60Q 3/74; B60Q 3/70; B60Q 3/217; B60Q 3/76; B60Q 3/20; H05B 47/105; H05B 47/125; H05B 47/115; G06K 2009/00939; G06K 9/0061; G06K 9/00832

See application file for complete search history.

(56) References Cited

U.S. PATENT DOCUMENTS

| | | | |
|---|---|---|---|
| 10,434,940 B1 * | 10/2019 | Verduzco Ochoa | ... B60Q 3/745 |
| 10,674,003 B1 * | 6/2020 | Kang | ............... H04M 1/72433 |
| 10,940,790 B1 * | 3/2021 | Mazuir | ................... F21V 14/04 |
| 2008/0228577 A1 | 9/2008 | Decre et al. | |
| 2015/0197193 A1 | 7/2015 | Oba et al. | |
| 2016/0152178 A1 | 6/2016 | Peterson et al. | |
| 2017/0286037 A1 | 10/2017 | Sizelove | |
| 2018/0136733 A1 | 5/2018 | Schalla et al. | |

(Continued)

FOREIGN PATENT DOCUMENTS

DE 102013021928 A1 6/2015
EP 2765568 A1 8/2014

(Continued)

*Primary Examiner* — Renan Luque
(74) *Attorney, Agent, or Firm* — Hauptman Ham, LLP

(57) ABSTRACT

A vehicle in-cabin lighting system includes: an outward gaze guiding section that is provided inside a vehicle cabin at a vehicle front side and at a vehicle width direction outer side of a vehicle seat, and that becomes brighter than its surroundings on activation of an outer side lighting device; and a control section that is configured to determine whether or not an occupant sifting on the vehicle seat has an interest in interacting with another occupant inside the vehicle cabin based on detection of operation of an operation section by the occupant or based on detection of a state of the occupant, and to activate the outer side lighting device so as to make the outward gaze guiding section brighter in a case in which determination is made that there is no interest in interacting.

14 Claims, 13 Drawing Sheets

(56) References Cited

U.S. PATENT DOCUMENTS

| | | | |
|---|---|---|---|
| 2018/0221932 A1 | 8/2018 | Von Novak et al. | |
| 2018/0224932 A1* | 8/2018 | Von Novak | G06F 3/013 |
| 2020/0074640 A1* | 3/2020 | Moon | G06K 9/00832 |
| 2020/0223328 A1 | 7/2020 | Kobayashi et al. | |
| 2021/0178963 A1* | 6/2021 | Lee | B60Q 3/51 |

FOREIGN PATENT DOCUMENTS

| | | |
|---|---|---|
| JP | 201697780 A | 5/2016 |
| JP | 2016137202 A | 8/2016 |
| JP | 20196146 A | 1/2019 |
| JP | 2020111292 A | 7/2020 |
| KR | 101251944 B1 | 4/2013 |
| KR | 1020150020216 A | 2/2015 |
| KR | 1020190112274 A | 10/2019 |
| WO | 2014054641 A1 | 4/2014 |

\* cited by examiner

VEHICLE IN-CABIN LIGHTING SYSTEM, METHOD FOR ACTUATING VEHICLE IN-CABIN LIGHTING SYSTEM, AND STORAGE MEDIUM

CROSS-REFERENCE TO RELATED APPLICATION

This application is based on and claims priority under 35 USC 119 from Japanese Patent Application No. 2020-020145 filed on Feb. 7, 2020, the disclosure of which is incorporated by reference herein.

BACKGROUND

Technical Field

The present disclosure relates to a vehicle in-cabin lighting system, a method for actuating a vehicle in-cabin lighting system, and a storage medium.

Related Art

Japanese Patent Application Laid-Open (JP-A) No. 2016-97780 discloses a rotary seat device for a vehicle, in which adjacent seats in a vehicle are coupled together so as to be capable of rotating in directions toward or away from each other. In this vehicle rotary seat device, the seats are rotated to desired angles by seat occupants using a seat rotation mechanism in order to allow the occupants to pass the time in a pleasant environment.

However, in the rotary seat device of JP-A No. 2016-97780, it is necessary to provide a seat rotation mechanism to each seat to be rotated. There is therefore room for improvement from the perspective of reducing cost and weight.

SUMMARY

In consideration of the above circumstances, the present disclosure provides a vehicle in-cabin lighting system, a method for actuating a vehicle in-cabin lighting system, and a storage medium that enable respective occupants to pass the time in greater comfort, while reducing in cost and weight.

A first aspect of the present disclosure is a vehicle in-cabin lighting system including an outward gaze guiding section that is provided inside a vehicle cabin at a vehicle front side and at a vehicle width direction outer side of a vehicle seat, and that becomes brighter than its surroundings on activation of an outer side lighting device; and a control section that is configured to determine whether or not an occupant sitting on the vehicle seat has an interest in interacting with another occupant inside the vehicle cabin based on detection of operation of an operation section by the occupant or based on detection of a state of the occupant, and to activate the outer side lighting device so as to make the outward gaze guiding section brighter in a case in which determination is made that there is no interest in interacting.

In the vehicle in-cabin lighting system according to the first aspect, the outward gaze guiding section is provided inside the vehicle cabin at the vehicle front side and vehicle width direction outer side of the vehicle seat. The outward gaze guiding section becomes brighter than its surroundings on activation of the outer side lighting device. The outer side lighting device is activated by the control section. The control section is configured to determine whether or not the occupant sitting on the vehicle seat has an interest in interacting with another occupant inside the vehicle cabin based on detection of operation of the operation section by the occupant sitting on the vehicle seat, or based on detection of a state of the occupant sitting on the vehicle seat. The control section activates the outer side lighting device in cases in which determination is made that the occupant has no interest in interacting with the other occupant. Activation of the outer side lighting device makes the outward gaze guiding section brighter than its surroundings so as to guide the gaze of the occupant naturally toward the vehicle width direction outer side, such that the other occupant inside the vehicle cabin does not readily enter the field of vision of the occupant.

Moreover, since there is no need to provide the vehicle seat with a mechanism such as a seat rotation mechanism to mechanically rotate the vehicle seat, cost and weight may be reduced compared to structures provided with a seat rotation mechanism.

In this manner, the vehicle in-cabin lighting system according to the first aspect enables the respective occupants to pass the time in greater comfort, while reducing cost and weight.

In the first aspect, configuration may be made wherein the outward gaze guiding section comprises at least one of a pillar garnish or a door garnish; the outer side lighting device is installed at the vehicle width direction outer side of at least one of the pillar garnish or the door garnish; and light is emitted from the at least one of the pillar garnish or the door garnish on activation of the outer side lighting device.

In the above configuration, light is emitted from the at least one of the pillar garnish or the door garnish on activation of the outer side lighting device so as to guide the gaze of the occupant toward the vehicle width direction outer side. Note that the outer side lighting device is installed at the vehicle width direction outer side of at least one of the pillar garnish or the door garnish. The outer side lighting device is therefore not directly visible to the occupant.

The above configuration enables the interior styling of the vehicle cabin to be improved.

In the first aspect, configuration may be made wherein the outward gaze guiding section comprises at least one of a pillar garnish or a door garnish; the outer side lighting device is installed on a ceiling inside the vehicle cabin and is directed toward at least one of the pillar garnish or the door garnish; and the at least one of the pillar garnish or the door garnish is made brighter on activation of the outer side lighting device.

In the above configuration, the at least one of the pillar garnish or the door garnish is illuminated with light from the ceiling on activation of the outer side lighting device. The at least one of the pillar garnish or the door garnish accordingly becomes brighter, thereby guiding the gaze of the occupant toward the vehicle width direction outer side. Moreover, since there is no lighting device installed inside the pillar garnish or inside the door garnish, the pillar garnish or the door garnish may be formed thinner.

The above configuration enables a larger space to be made available inside the vehicle cabin compared to configurations in which the outer side lighting device is installed at the vehicle width direction outer side of a pillar garnish or a door garnish.

A second aspect of the present disclosure is a vehicle in-cabin lighting system including an inward gaze guiding section that is provided inside a vehicle cabin at a vehicle front side and at a vehicle width direction inner side of a vehicle seat, and that becomes brighter than its surroundings on activation of an inner side lighting device; and a control section that is configured to determine whether or not an occupant sitting on the vehicle seat has an interest in interacting with another occupant inside the vehicle cabin based on detection of operation of an operation section by the occupant or based on detection of a state of the occupant, and to activate the inner side lighting device so as to make the inward gaze guiding section brighter in a case in which determination is made that there is an interest in interacting.

In the vehicle in-cabin lighting system according to the second aspect, the inward gaze guiding section is provided inside the vehicle cabin at the vehicle front side and vehicle width direction inner side of the vehicle seat. The inward gaze guiding section becomes brighter than its surroundings on activation of the inner side lighting device. The inner side lighting device is activated by the control section. The control section is configured to determine whether or not the occupant sitting on the vehicle seat has an interest in interacting with another occupant inside the vehicle cabin based on detection of operation of the operation section by the occupant sitting on the vehicle seat, or based on detection of a state of the occupant sitting on the vehicle seat. The control section activates the inner side lighting device in cases in which determination is made that the occupant has an interest in interacting with the other occupant. Activation of the inner side lighting device makes the inward gaze guiding section brighter than its surroundings, thus directing the gaze of the occupant naturally toward the vehicle width direction inner side, namely in a direction toward where the other occupant is sitting, and thereby enabling a space conducive to communication to be established.

Moreover, since there is no need to provide the vehicle seat with a mechanism such as a seat rotation mechanism to mechanically rotate the vehicle seat, cost and weight may be reduced compared to structures provided with a seat rotation mechanism.

In this manner, the vehicle in-cabin lighting system according to the second aspect enables the respective occupants to pass the time in greater comfort, while reducing cost and weight.

In the second aspect, configuration may be made wherein the an inward gaze guiding section comprises at least one of a front seat armrest or a center console; the inner side lighting device is installed inside at least one of the front seat armrest or the center console; and the processor is configured to activate the inner side lighting device so that light is emitted from the at least one of the armrest or the center console.

In the above configuration, light is emitted from the at least one of the armrest or the center console on activation of the inner side lighting device, thereby guiding the gaze of the occupant toward the vehicle width direction inner side. Note that the inner side lighting device is installed inside the at least one of the armrest or the center console. The inner side lighting device is therefore not directly visible to the occupant.

The above configuration enables the interior styling of the vehicle cabin to be improved.

In the second aspect, configuration may be made wherein the an inward gaze guiding section comprises at least one of a front seat armrest or a center console; the inner side lighting device is installed on a ceiling inside the vehicle cabin and is directed toward at least one of the front seat armrest or the center console; and the at least one of the armrest or the center console is made brighter on activation of the inner side lighting device.

In the above configuration, the at least one of the armrest or the center console is illuminated with light from the ceiling on activation of the inner side lighting device. The at least one of the armrest or the center console is accordingly made brighter. This guides the gaze of the occupant toward the vehicle width direction inner side. Moreover, the armrest or the center console may be made more compact since there is no lighting device installed in the armrest or the center console.

The above configuration enables a larger space to be made available inside the vehicle cabin compared to configurations in which the inner side lighting device is installed inside the armrest or inside the center console.

In the second aspect, configuration may be made wherein the inner side lighting device is a reading lamp configured to shine light directly in front of an occupant, and the control section is configured to make the at least one of the armrest or the center console brighter by changing a lighting direction of the reading lamp.

In the above configuration, the reading lamp shines light directly in front of the occupant when activated. Moreover, the control section makes the at least one of the armrest or the center console brighter by changing the beam direction of the reading lamp in cases in which the occupant has been determined to have an interest in interacting with the other occupant, thereby guiding the gaze of the occupant toward the vehicle width direction inner side. Utilizing the reading lamp in this manner enables the gaze of the occupant to be guided toward the vehicle width direction inner side.

The above configuration does not require a dedicated lighting device in order to guide the gaze of the occupant toward the vehicle width direction inner side.

The first aspect or the second aspect may further include an emotional state estimation section that is configured to estimate an emotional state of the occupant sitting on the vehicle seat and to output a signal indicating the estimated emotional state, wherein the control section determines whether or not the occupant sitting on the vehicle seat has an interest in interacting with the other occupant based on the signal output from the emotional state estimation section.

In the above configuration, the emotional state estimation section estimates the emotional state of the occupant sitting on the vehicle seat. The control section then determines whether or not the occupant sitting on the vehicle seat has an interest in interacting with the other occupant based on a signal from the emotional state estimation section. There is accordingly no need for the occupant to perform a specific operation.

The above configuration enables a comfortable space to be established for the respective occupants without the occupants performing a specific operation.

In the first aspect, configuration may be made further including an inward gaze guiding section that is provided inside the vehicle cabin at the vehicle front side and at a vehicle width direction inner side of the vehicle seat, and that becomes brighter than its surroundings on activation of an inner side lighting device, wherein the control section is configured to determine whether or not the occupant sitting on the vehicle seat has an interest in interacting with another occupant inside the vehicle cabin based on detection of operation of the operation section by the occupant or based on detection of a state of the occupant, configured to activate the outer side lighting device so as to make the outward gaze guiding section brighter in a case in which determination is made that there is no interest in interacting, and configured to activate the inner side lighting device so as to make the inward gaze guiding section brighter in a case in which determination is made that there is an interest in interacting.

In the above configuration, the control section activates the outer side lighting device so as to make the outward gaze guiding section brighter in cases in which determination is made that the occupant does not have an interest in interacting with the other occupant. The gaze of the occupant is thereby guided toward the vehicle width direction outer side. On the other hand, the control section activates the inner side lighting device so as to make the inward gaze guiding section brighter in cases in which determination is made that the occupant does have an interest in interacting with the other occupant. The gaze of the occupant is thereby guided toward the vehicle width direction inner side.

The above configuration enables a comfortable space to be established for the respective occupants both in cases in which the occupant has an interest in interacting with the other occupant, and in cases in which the occupant does not have an interest in interacting with the other occupant.

A third aspect of the present disclosure is a method for actuating a vehicle in-cabin lighting system provided inside a vehicle cabin and comprising a gaze guiding section that becomes brighter than its surroundings on activation of a lighting device, the method including: determining whether or not an occupant sitting on a vehicle seat has an interest in interacting with another occupant inside the vehicle cabin based on detection of operation of an operation section by the occupant or based on detection of a state of the occupant; and activating the lighting device so as to make the gaze guiding section brighter based on the determined presence or absence of interest in interacting with the other occupant.

A fourth aspect of the present disclosure is non-transitory storage medium storing a program that causes a computer to execute processing to actuate a vehicle in-cabin lighting system provided inside a vehicle cabin, the system comprising a gaze guiding section that becomes brighter than its surroundings on activation of a lighting device, the processing including: determining whether or not an occupant sitting on a vehicle seat has an interest in interacting with another occupant inside the vehicle cabin based on detection of operation of an operation section by the occupant or based on detection of a state of the occupant; and activating the lighting device so as to make the gaze guiding section brighter based on the determined presence or absence of interest in interacting with the other occupant.

Similarly to the first aspect and the second aspect, the third aspect and the fourth aspect enable the respective occupants to pass the time in greater comfort, while reducing cost and weight.

BRIEF DESCRIPTION OF THE DRAWINGS

Exemplary embodiments of the present disclosure will be described in detail based on the following figures, wherein.

DETAILED DESCRIPTION

First Exemplary Embodiment

Explanation follows regarding a vehicle 12 applied with a vehicle in-cabin lighting system 10 according to a first exemplary embodiment, with reference to the drawings. Note that in the respective drawings, the arrow FR, the arrow UP, and the arrow RH respectively indicate a front direction, and upper direction, and a right direction of the vehicle. In the following explanation, unless specifically stated otherwise, reference simply to front and rear, upward and downward, and left and right directions refers to front and rear in a vehicle front-rear direction, upward and downward in a vehicle vertical direction, and left and right when facing in a forward direction of the vehicle. Dimensions and scale may be exaggerated in some of the drawings in order to clarify explanation.

Figure 1:
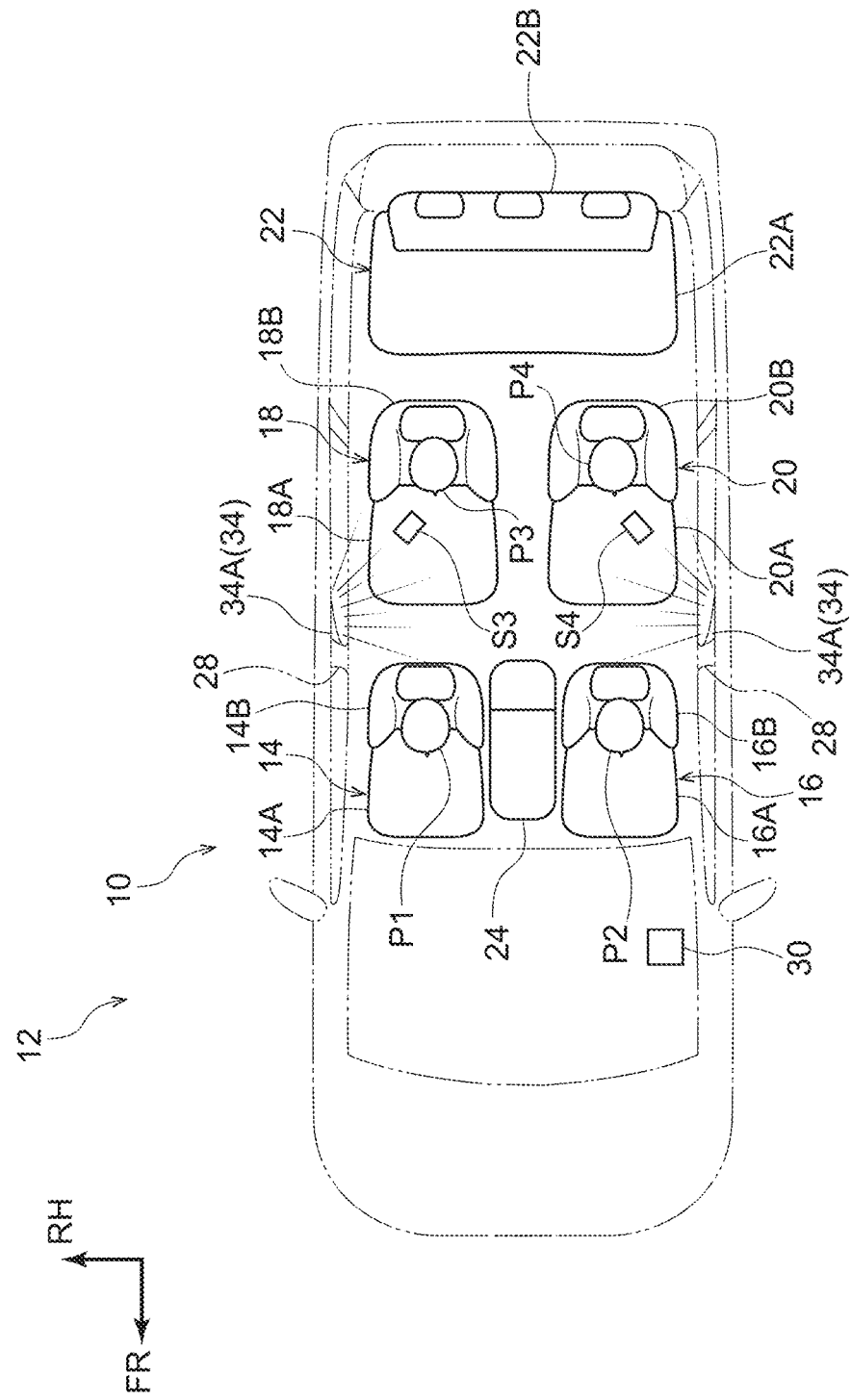
FIG. 1 is a schematic plan view illustrating relevant portions of a vehicle applied with a vehicle in-cabin lighting system according to a first exemplary embodiment.

As illustrated in FIG. 1, as an example the vehicle 12 of the first exemplary embodiment includes three rows of seats arrayed in the vehicle front-rear direction. Specifically, a first vehicle seat 14 (hereafter referred to as the first seat 14) and a second vehicle seat 16 (hereafter referred to as the second seat 16) are arranged in a vehicle width direction in a front section inside the vehicle cabin. A third vehicle seat 18 (hereafter referred to as the third seat 18) is arranged at the vehicle rear side of the first seat 14, and a fourth vehicle seat 20 (hereafter referred to as the fourth seat 20) is arranged at the vehicle rear side of the second seat 16. A fifth vehicle seat 22 (hereafter referred to as the fifth seat 22) is arranged at the vehicle rear side of the third seat 18 and the fourth seat 20.

The first seat 14 is arranged on the vehicle right side, and an occupant P1 sits on the first seat 14. The first seat 14 includes a seat cushion 14A capable of supporting the buttocks and thighs of the occupant P1 from below, and a seatback 14B capable of supporting the back of the occupant P1 from behind. A non-illustrated steering wheel is provided at the vehicle front side of the first seat 14. Namely, the first seat 14 configures a driving seat, and the occupant P1 sitting on the first seat 14 is a driver. Note that for ease of explanation, only the head of the occupant P1 is illustrated, and the body of the occupant P1 is not illustrated. Similar applies to an occupant P2, an occupant P3, and an occupant P4, described later.

The second seat 16 is arranged on the vehicle left side of the first seat 14, and the occupant P2 sits on the second seat 16. The second seat 16 includes a seat cushion 16A and a seatback 16B. The second seat 16 therefore configures a front passenger seat. A center console 24 is disposed between the first seat 14 and the second seat 16.

The third seat 18 is arranged at the vehicle rear side of the first seat 14, and the occupant P3 sits on the third seat 18. The third seat 18 includes a seat cushion 18A and a seatback 18B. The fourth seat 20 is arranged on the vehicle left side of the third seat 18, and the occupant P4 sits on the fourth seat 20. The fourth seat 20 includes a seat cushion 20A and a seatback 20B.

The fifth seat 22 is arranged at the vehicle rear side of the third seat 18 and the fourth seat 20, and extends from one vehicle width direction end portion to another vehicle width direction end portion inside the vehicle cabin to configure a three-seater bench seat. The fifth seat 22 includes a seat cushion 22A and a seatback 22B. Note that the fifth seat 22 is vacant in FIG. 1. Namely, there are no occupants sitting on the fifth seat 22. As an example, the configuration of the present exemplary embodiment enables the occupant P3 sitting on the third seat 18 and the occupant P4 sitting on the fourth seat 20 to pass their time in comfort. The occupant P3 is in possession of a portable terminal S3, serving as an operation section, and the occupant P4 is in possession of a portable terminal S4, serving as an operation section. The portable terminal S3 and the portable terminal S4 are smartphones.

A pillar garnish 28 configuring an interior decorative member covering a center pillar from the vehicle cabin inside is disposed on the vehicle right side between the first seat 14 and the third seat 18. A pillar garnish 28 is also disposed on the vehicle left side between the second seat 16 and the fourth seat 20. The pillar garnishes 28 each extend along the vehicle vertical direction following the respective center pillars.

Figure 2:
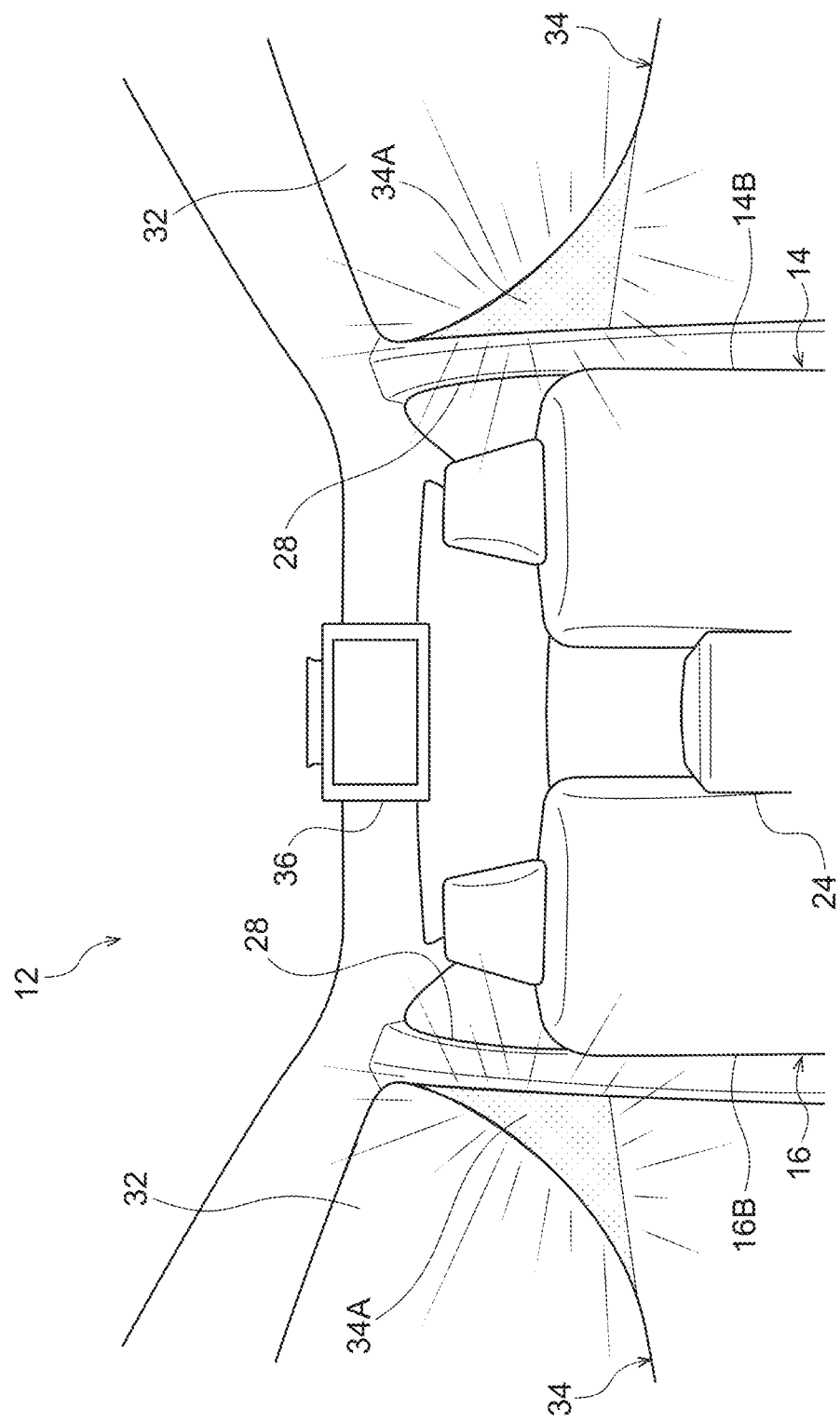
FIG. 2 is a diagram of a vehicle cabin inside of the vehicle of the first exemplary embodiment as viewed from a vehicle rear side.

As illustrated in FIG. 2, rear side windows 32 are disposed at the vehicle rear sides of the respective pillar garnishes 28. A door trim 34, configuring an interior decorative member, is disposed below each of the rear side windows 32 so as to cover a side door panel from the vehicle cabin inside. A door garnish 34A, serving as an outward gaze guiding section, is provided at the upper side of each of the door trims 34 of the present exemplary embodiment.

The door garnish 34A on the right side is provided at the vehicle front side and vehicle width direction outer side of the third seat 18, and is curved so as to be positioned further toward the vehicle upper side on progression toward the vehicle front side. The door garnish 34A on the left side is provided at the vehicle front side and vehicle width direction outer side of the fourth seat 20, and is formed with the same shape as the door garnish 34A on the right side. Note that the door garnish 34A on the right side is configured to emit light from its surface when a right outer side lighting device 52 (see FIG. 3) is activated. When emitting light from its surface, the door garnish 34A on the right side becomes brighter than its surroundings. Similarly, the door garnish 34A on the left side is configured to emit light from its surface when a left outer side lighting device 54 (see FIG. 3) is activated. When emitting light from its surface, the door garnish 34A on the left side becomes brighter than its surroundings.

A rear-facing monitor 36 is provided to a ceiling inside the vehicle cabin. The rear-facing monitor 36 is suspended from the ceiling, and is visible to the occupants sitting on the third seat 18, the fourth seat 20, and the fifth seat 22 in the second row and the third row. The rear-facing monitor 36 displays entertainment content such as movies or television programs.

Hardware Configuration of Vehicle In-Cabin Lighting System 10

Figure 3:
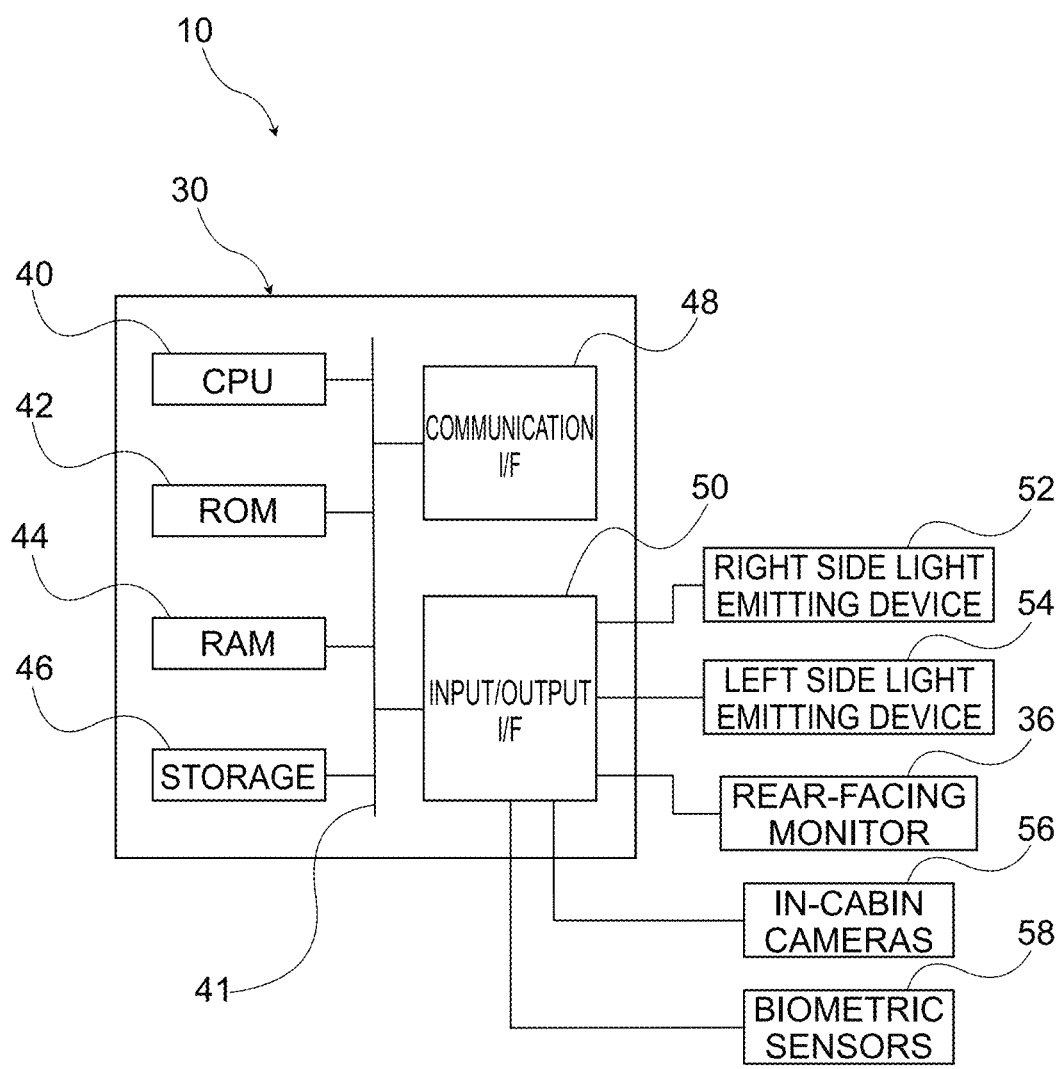
FIG. 3 is a block diagram illustrating a hardware configuration of the vehicle in-cabin lighting system according to the first exemplary embodiment.

As illustrated in FIG. 1, the vehicle 12 is provided with an electronic control unit (ECU) 30, serving as a control section. FIG. 3 is a block diagram illustrating a hardware configuration of the vehicle in-cabin lighting system 10. As illustrated in FIG. 3, the ECU 30 of the vehicle in-cabin lighting system 10 includes a central processing unit (CPU: a processor) 40, read only memory (ROM) 42, random access memory (RAM) 44, storage 46, a communication interface 48, and an input/output interface 50. These respective configurations are connected together through a bus 41 so as to be capable of communicating with each other.

The CPU 40 is a central processing unit that executes various programs and controls various sections. Namely, the CPU 40 reads a program from the ROM 42 or the storage 46, and executes the program using the RAM 44 as a workspace. The CPU 40 controls the various configurations mentioned above and performs various arithmetic processing according to the program recorded in the ROM 42 or the storage 46.

The ROM 42 holds various programs and various data. The RAM 44 serves as a workspace that temporarily stores programs and data. The storage 46 is configured by a hard disk drive (HDD) or a solid state drive (SSD), and holds various programs including an operating system, and various data. In the first exemplary embodiment, a program and various data used to perform lighting control processing are held in the ROM 42 or the storage 46.

The communication interface 48 is an interface used by the vehicle in-cabin lighting system 10 to communicate with a non-illustrated server, the portable terminals S3, S4 in the possession of the occupants, and other devices. For example, the communication interface 48 employs a protocol such as Ethernet®, LTE, FDDI, Wi-Fi®, or Bluetooth®.

The right outer side lighting device 52, the left outer side lighting device 54, the rear-facing monitor 36, in-cabin cameras 56, and biometric sensors 58 are each connected to the input/output interface 50. The right outer side lighting device 52 is installed at the vehicle width direction outer side of the door garnish 34A on the right side as illustrated in FIG. 2. Namely, the right outer side lighting device 52 is installed in a space between the right side door garnish 34A and a non-illustrated door panel, and lights up when activated. The left outer side lighting device 54 is installed at the vehicle width direction outer side of the door garnish 34A on the left side as illustrated in FIG. 2. Namely, the left outer side lighting device 54 is installed in a space between the left side door garnish 34A and a non-illustrated door panel, and lights up when activated. Note that there is no particular limitation to light-up patterns of the right outer side lighting device 52 and the left outer side lighting device 54. For example, the right outer side lighting device 52 and the left outer side lighting device 54 might light up so as to turn on and off repeatedly (i.e. so as to flash). Alternatively, the door garnish 34A may be brightened locally so as to create a visual pattern that changes over time. Moreover, the brightness and color of the right outer side lighting device 52 and the left outer side lighting device 54 may be configured so as to change over time.

The rear-facing monitor 36 displays a movie, television program, or the like in response to, for example, instructions of the occupant P3 to the ECU 30 to turn on the rear-facing monitor 36 using the portable terminal S3 illustrated in FIG. 1. Similarly, the rear-facing monitor 36 displays a movie, television program, or the like in response to instructions of the occupant P4 to the ECU 30 to turn on the rear-facing monitor 36 using the portable terminal S4 illustrated in FIG. 1. The ECU 30 may also turn on the rear-facing monitor 36 under predetermined conditions even if not instructed to do so by the occupant P3 or the occupant P4.

The in-cabin cameras 56 are, for example, installed on an instrument panel and on the ceiling, and capture images of the occupants sitting on the third seat 18, the fourth seat 20, and the fifth seat 22. The captured image data of the occupants is transmitted to the ECU 30. In the first exemplary embodiment, since there is no occupant sitting on the fifth seat 22, the in-cabin cameras 56 image the occupant P3 on the third seat 18 and the occupant P4 on the fourth seat 20.

The biometric sensors 58 are, for example, provided in the seatback 18B of the third seat 18, the seatback 20B of the fourth seat 20, and the seatback 22B of the fifth seat 22. Biometric signals from the occupants sitting on the third seat 18, the fourth seat 20, and the fifth seat 22 are acquired by the biometric sensors 58 and transmitted to the ECU 30. The biometric signals referred to here include heartrate signals and respiration signals.

Functional Configuration of Vehicle In-Cabin Lighting System 10

The vehicle in-cabin lighting system 10 implements various functionality using the hardware resources described above. Explanation follows regarding functional configurations implemented by the vehicle in-cabin lighting system 10, with reference to FIG. 4.

Figure 4:
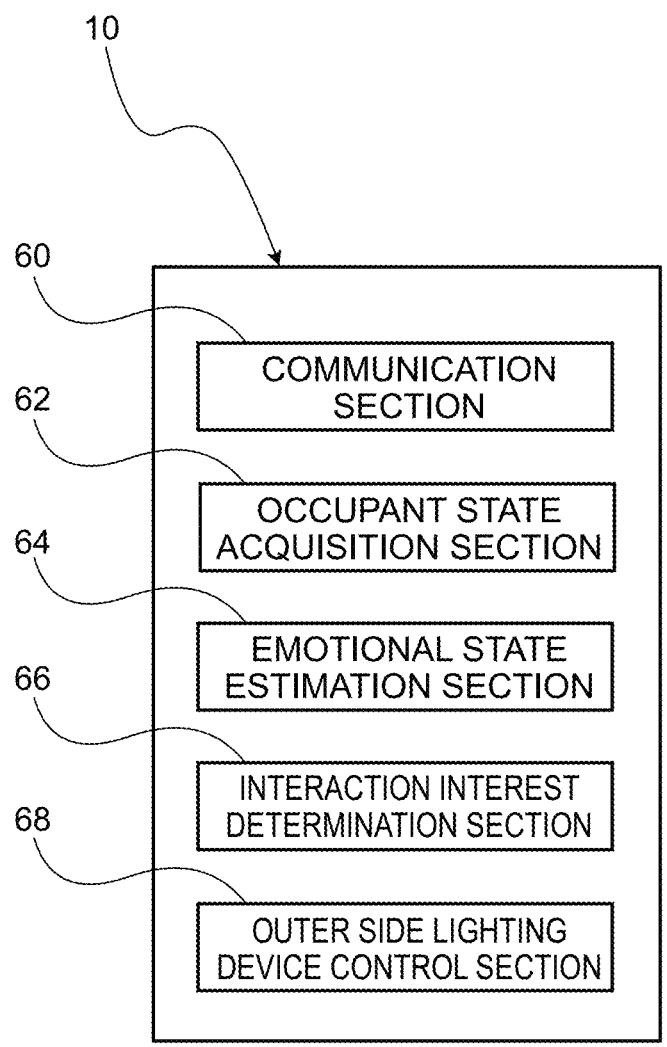
FIG. 4 is a block diagram illustrating functional configuration of the vehicle in-cabin lighting system according to the first exemplary embodiment.

As illustrated in FIG. 4, the functional configuration of the vehicle in-cabin lighting system 10 includes a communication section 60, an occupant state acquisition section 62, an emotional state estimation section 64, an interaction interest determination section 66, and an outer side lighting device control section 68. Note that the respective functional configuration is implemented by the CPU 40 reading and executing a program stored in the ROM 42 or the storage 46.

The communication section 60 exchanges data with an external server and other devices through the communication interface 48. For example, the communication section 60 exchanges data with the portable terminals S3, S4 in the possession of the occupants sitting on the various vehicle seats.

The occupant state acquisition section 62 acquires states of the occupants sitting on the third seat 18, the fourth seat 20, and the fifth seat 22. Specifically, the occupant state acquisition section 62 receives data from the in-cabin cameras 56 and the biometric sensors 58 in order to acquire the states of the occupant P3 and the occupant P4. For example, gaze direction, alertness level, and facial expression of both the occupant P3 and the occupant P4 are detected based on the image data captured by the in-cabin cameras 56. The occupant state acquisition section 62 also extracts a high frequency fluctuation component (HF component) corresponding to fluctuations in respiration, and a low frequency component (LF component) corresponding to Mayer waves, these being blood pressure fluctuations, from time series data of fluctuations in the heartrates of the occupant P3 and the occupant P4 as acquired by the biometric sensors 58. Extracting the HF component and the LF component in this manner enables stress states of the occupant P3 and the occupant P4 to be determined. Namely, since the HF component appears when the parasympathetic nervous system is dominant, based on a stress index (a sympathetic nervous system activity level) of the ratio of LF to HF, a relaxed state may be surmised when the parasympathetic nervous system is active, and a stressed state may be surmised when the sympathetic nervous system is active.

The emotional state estimation section 64 estimates the emotional states of the occupant P3 and the occupant P4 sitting on the third seat 18, and the fourth seat 20, and of any occupant sitting on the fifth seat 22. Specifically, the emotional state estimation section 64 estimates the emotional states of the occupant P3 and the occupant P4 based on data received from the in-cabin cameras 56 and the biometric sensors 58. For example, the facial expressions of the occupant P3 and the occupant P4 may be read from the image data captured by the in-cabin cameras 56 in order to estimate their emotional states. Alternatively, the emotional states of the occupant P3 and the occupant P4 may be estimated from pulse rates acquired by the biometric sensors 58.

The interaction interest determination section 66 determines whether or not each of the occupant P3 and the occupant P4 sitting on the third seat 18 and the fourth seat 20, and any occupant sitting on the fifth seat 22 has an interest in interacting with another occupant inside the vehicle cabin. Specifically, in cases in which the occupant P3 operates their portable terminal S3 so as to transmit a signal to the ECU 30, the interaction interest determination section 66 determines whether or not the occupant P3 has an interest in interacting with the other occupant P4, based on the received signal. Moreover, in cases in which the occupant P4 operates their portable terminal S4 so as to transmit a signal to the ECU 30, the interaction interest determination section 66 determines whether or not the occupant P4 has an interest in interacting with the other occupant P3, based on the received signal. For example, in a case in which the occupant P3 sitting on the third seat 18 in FIG. 1 operates their portable terminal S3 to transmit a signal to the ECU 30 to indicate that they wish to be left alone, the interaction interest determination section 66 determines that the occupant P3 does not have an interest in interacting with the other occupant P4.

Conversely, in a case in which the occupant P3 sitting on the third seat 18 operates their portable terminal S3 to transmit a signal to the ECU 30 to indicate that they wish to engage with the other occupant P4, the interaction interest determination section 66 determines that the occupant P3 does have an interest in interacting with the other occupant P4.

Even in cases in which neither the portable terminal S3 nor the portable terminal S4 has been operated, the interaction interest determination section 66 determines whether or not there is an interest in interacting with other occupants based on signals from the occupant state acquisition section 62 and the emotional state estimation section 64. For example, the ECU 30 measures the length of time for which the gaze of the occupant P3 is directed toward the vehicle exterior within a predetermined timeframe, based on the image data of the occupant P3 captured by the in-cabin cameras 56. In cases in which the gaze of the occupant P3 is directed toward the vehicle exterior for a long time, the interaction interest determination section 66 determines that the occupant P3 does not have an interest in interacting with the other occupant P4.

Alternatively, for example, the interaction interest determination section 66 may determine that the occupant P3 does not have an interest in interacting with the other occupant P4 in cases in which the occupant P3 has been estimated to be in a stressed state by the functionality of the emotional state estimation section 64, based on time series data regarding the heartrate fluctuations of the occupant P3. Conversely, the interaction interest determination section 66 may determine that the occupant P3 does have an interest in interacting with the other occupant P4 in cases in which the occupant P3 has been estimated to be in a relaxed state by the functionality of the emotional state estimation section 64.

In cases in which the occupant P3 has been determined not to have an interest in interacting with the other occupant P4 by the functionality of the interaction interest determination section 66, the outer side lighting device control section 68 activates the right outer side lighting device 52 such that the right side door garnish 34A becomes brighter. Thus, the gaze of the occupant P3 is naturally directed toward the right side door garnish 34A, such that the occupant P4 does not readily enter the field of vision of the occupant P3.

Similarly, in cases in which the occupant P4 has been determined not to have an interest in interacting with the other occupant P3 by the functionality of the interaction interest determination section 66, the outer side lighting device control section 68 activates the left outer side lighting device 54 such that the left side door garnish 34A becomes brighter. Thus, the gaze of the occupant P4 is naturally directed toward the left side door garnish 34A, such that the occupant P3 does not readily enter the field of vision of the occupant P4. In this manner, the first exemplary embodiment is configured such that the right outer side lighting device 52 and the left outer side lighting device 54 are controlled independently of each other. Thus, for example, the right outer side lighting device 52 may be activated on its own, while the left outer side lighting device 54 remains in an inactive state. For example, the right outer side lighting device 52 may be activated in cases in which the occupant P3 has been determined not to have an interest in interacting with the other occupant P4 by the functionality of the interaction interest determination section 66, with the right side door garnish 34A alone being made brighter and the left outer side lighting device 54 not being activated in cases in which the occupant P4 is asleep.

Operation

Explanation follows regarding operation of the present exemplary embodiment.

Lighting Control Processing

Figure 5:
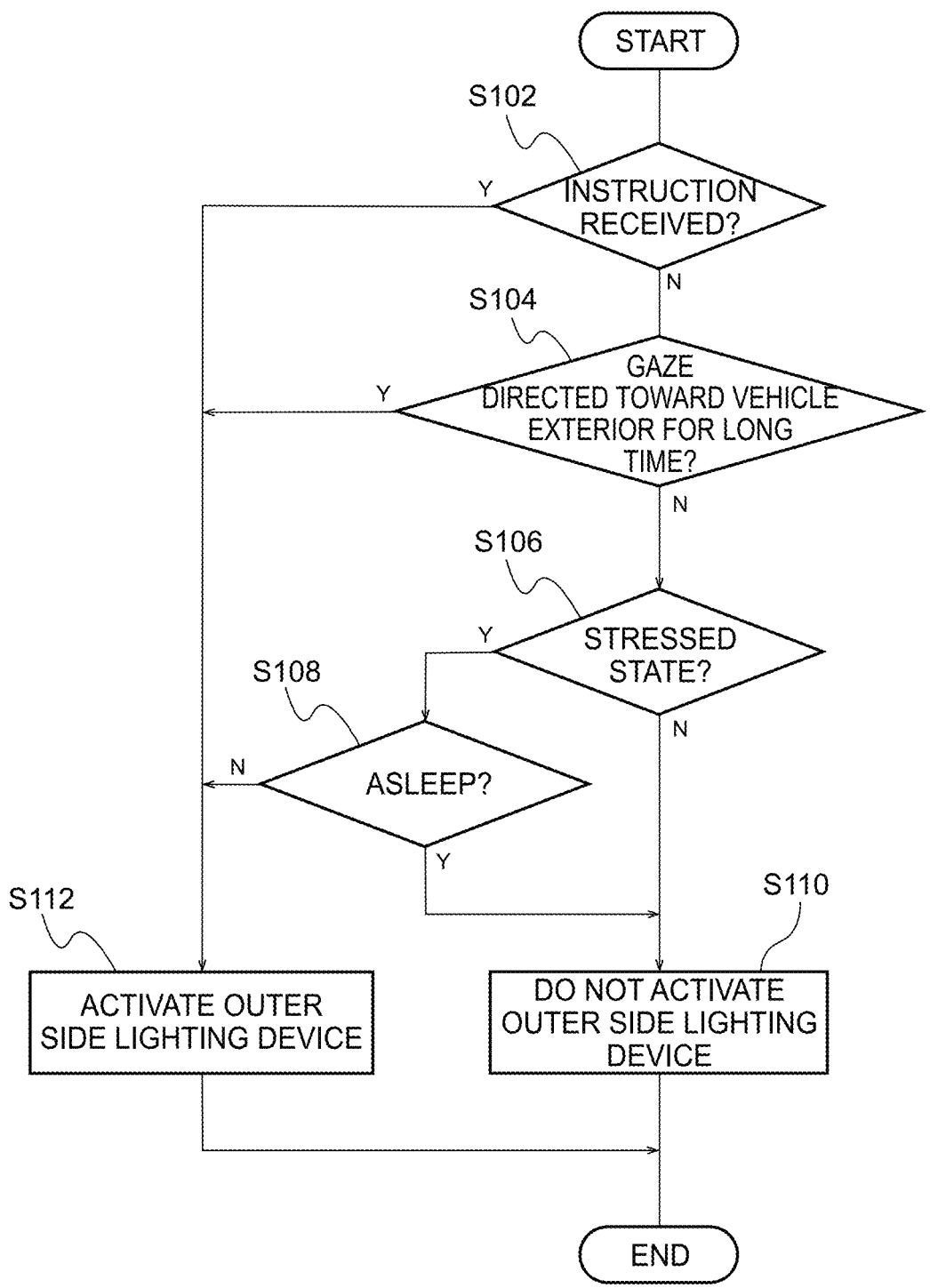
FIG. 5 is a flowchart illustrating an example of a flow of lighting control processing in the first exemplary embodiment.

Explanation follows regarding an example of the lighting control processing to control the right outer side lighting device 52 and the left outer side lighting device 54, with reference to the flowchart illustrated in FIG. 5. This lighting control processing is executed by the CPU 40 reading the program from the ROM 42 or the storage 46, and loading the program on the RAM 44. Note that although in the following explanation, an example is described in which the processing is executed for the occupant P3 sifting on the third seat 18, processing would be executed similarly for the occupant P4 sitting on the fourth seat 20.

As illustrated in FIG. 5, at step S102, the CPU 40 determines whether or not an instruction has been received from the occupant P3. Specifically, the CPU 40 uses the functionality of the communication section 60 (see FIG. 4) to detect operation of the portable terminal S3 by the occupant P3 in order to determine whether or not an instruction has been received. The instruction referred to here is an instruction indicating that the occupant wishes to be left alone. In cases in which any other instruction has been transmitted, the CPU 40 determines that an instruction has not been received at step S102.

In cases in which the CPU 40 has determined that an instruction indicating that the occupant P3 wishes to be left alone has been received from the occupant P3 at step S102, processing transitions to step S112. In cases in which the CPU 40 has determined that an instruction indicating that the occupant P3 wishes to be left alone has not been received from the occupant P3 at step S102, processing transitions to step S104. Note that the processing of step S104 is described first, and the processing of step S112 will be described later.

At step S104, the CPU 40 determines whether or not the occupant P3 has been directing their gaze toward the vehicle exterior for a long time. Specifically, the CPU 40 uses the functionality of the occupant state acquisition section 62 (see FIG. 4) to measure the total time for which the occupant P3 has directed their gaze toward the vehicle exterior during the predetermined timeframe based on the image data of the occupant P3 captured by the in-cabin cameras 56. For example, in cases in which the total time for which the occupant P3 has directed their gaze to the vehicle exterior during the predetermined timeframe is greater than a predetermined proportion of the predetermined timeframe, the CPU 40 determines that the occupant P3 has been directing their gaze to the vehicle exterior for a long time.

In cases in which the CPU 40 has determined that the occupant P3 has been directing their gaze toward the vehicle exterior for a long time at step S104, processing transitions to step S112. In cases in which the CPU 40 has determined that the occupant P3 has not been directing their gaze toward the vehicle exterior for a long time (namely, for a short time) at step S104, processing transitions to step S106. The processing of step S106 is described first, and the processing of step S112 will be described later.

At step S106, the CPU 40 determines whether or not the occupant P3 is in a stressed state. Specifically, the CPU 40 uses the functionality of the occupant state acquisition section 62 (see FIG. 4) to estimate whether the occupant P3 is in a stressed state or in a relaxed state based on the time series data regarding heartrate fluctuations. In cases in which the CPU 40 has determined that the occupant P3 is in a stressed state, processing transitions to step S108. In cases in which the CPU 40 has determined that the occupant P3 is not in a stressed state, processing transitions to step S110.

At step S108, the CPU 40 determines whether or not the occupant P3 is asleep. Specifically, the CPU 40 uses the functionality of the occupant state acquisition section 62 (see FIG. 4) to determine that the occupant P3 is asleep in cases in which the eyes of the occupant P3 have been closed for a predetermined duration or greater, based on image data captured by the in-cabin cameras 56. In addition to using the image data captured by the in-cabin cameras 56, the CPU 40 may also determine that the occupant P3 is asleep in cases in which the alertness level of the occupant P3 is low, based on the heartrate signal for the occupant P3 acquired by the biometric sensors 58.

In cases in which the CPU 40 has determined that the occupant P3 is asleep at step S108, processing transitions to step S110. In cases in which the CPU 40 has determined that the occupant P3 is not asleep at step S108, processing transitions to step S112.

At step S110, the CPU 40 does not activate the right outer side lighting device 52. Namely, the lighting control processing is ended without light being emitted from the surface of the door garnish 34A. Note that in cases in which the right outer side lighting device 52 is already in an activated state, activation of the right outer side lighting device 52 is stopped such that the door garnish 34A is extinguished, and the lighting control processing is then ended.

On the other hand, processing transitions to step S112 and the right outer side lighting device 52 is activated in cases in which the CPU 40 has determined that an instruction indicating that the occupant P3 wishes to be left alone has been received from the occupant P3 at step S102, in cases in which the CPU 40 has determined that the occupant P3 has been directing their gaze toward the vehicle exterior for a long time at step S104, and also in cases in which the CPU 40 has determined that the occupant P3 is not asleep at step S108. Thus, the right side door garnish 34A positioned at the vehicle width direction outer side of the third seat 18 on which the occupant P3 is sitting is made brighter than its surroundings. The CPU 40 then ends the lighting control processing.

The CPU 40 also executes similar lighting control processing for the occupant P4. In cases in which the processing has transitioned to step S112, the CPU 40 activates the left outer side lighting device 54. Thus, the left side door garnish 34A positioned at the vehicle width direction outer side of the fourth seat 20 on which the occupant P4 is sitting is made brighter than its surroundings.

The CPU 40 also executes similar lighting control processing in cases in which an occupant is sitting on the fifth seat 22. When this is performed, the CPU 40 controls the right outer side lighting device 52 in cases in which the occupant is sitting on the vehicle right side of the fifth seat 22, and controls the left outer side lighting device 54 in cases in which the occupant is sitting on the vehicle left side of the fifth seat 22. Note that as an example in the first exemplary embodiment, the CPU 40 does not execute the lighting control processing for an occupant sitting on a vehicle width direction central portion of the fifth seat 22.

As described above, in the vehicle in-cabin lighting system 10 according to the first exemplary embodiment, the door garnish 34A at the vehicle width direction outer side of the occupant is made brighter than its surroundings in cases in which the CPU 40 has determined that the occupant does not have an interest in interacting with the other occupant. This enables the gaze of the occupant to be directed naturally toward the vehicle width direction outer side, such that the other occupant inside the vehicle cabin does not readily enter the field of vision of the occupant. This enables a personal space to be established for the occupant.

Moreover, the need to provide a mechanism such as a seat rotation mechanism to mechanically rotate the third seat 18 and the fourth seat 20 is eliminated. This enables the respective occupants to pass the time in comfort while reducing cost and weight compared to structures in which the third seat 18 and the fourth seat 20 include a seat rotation mechanism.

In the first exemplary embodiment, the right outer side lighting device 52 is activated so as to cause the door garnish 34A provided at the upper side of the right side door trim 34 to emit light from its surface such that the gaze of the occupant P3 is guided toward the vehicle width direction outer side. Moreover, the left outer side lighting device 54 is activated so as to cause the door garnish 34A provided at the upper side of the left side door trim 34 to emit light from its surface such that the gaze of the occupant P4 is guided toward the vehicle width direction outer side. Note that the right outer side lighting device 52 and the left outer side lighting device 54 are installed at the vehicle width direction outer side of the respective door trims 34, and so are not directly visible to the occupants. This enables the interior styling of the vehicle cabin to be improved.

In the first exemplary embodiment, the ECU 30 determines whether or not there is an interest in interacting with the another occupant based on signals from the emotional state estimation section 64 that estimates the emotional states of the occupant P3 and the occupant P4 siting on the third seat 18 and the fourth seat 20. This enables a comfortable space to be established for the respective occupants without the occupant P3 and the occupant P4 needing to perform any specific operation.

In the first exemplary embodiment, the right outer side lighting device 52 and the left outer side lighting device 54 are installed at the vehicle width direction outer side of the respective door trims 34. However, there is no limitation thereto. For example, the configuration of a first modified example illustrated in FIG. 6 may be adopted.

FIRST MODIFIED EXAMPLE

Figure 6:
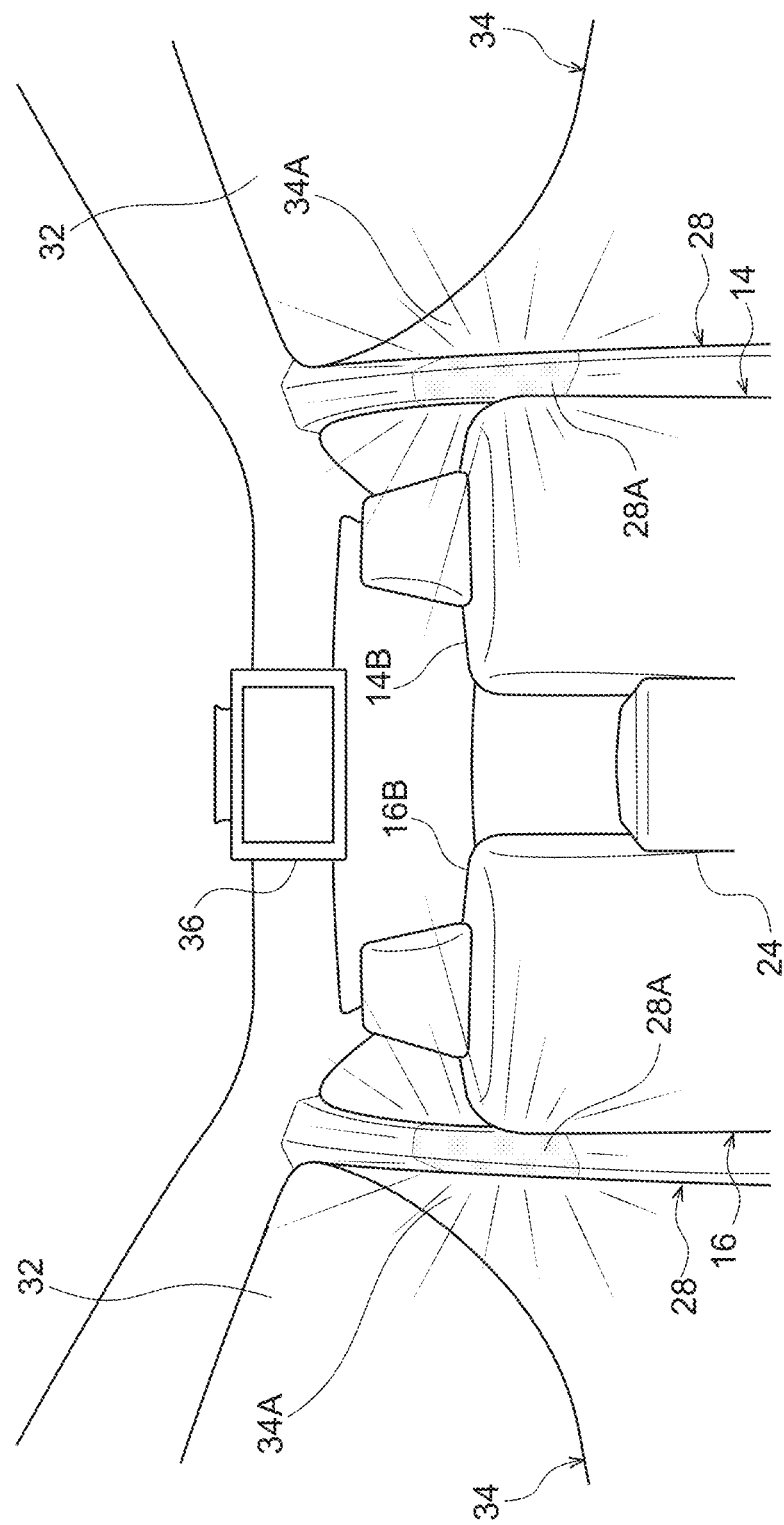
FIG. 6 is a diagram corresponding to FIG. 2, illustrating a first modified example of the vehicle in-cabin lighting system according to the first exemplary embodiment.

As illustrated in FIG. 6, in the first modified example, lighting devices are installed at the vehicle width direction outer side of the respective pillar garnishes 28. Specifically, a non-illustrated right outer side lighting device is installed at the vehicle width direction outer side of the pillar garnish 28 on the right side, and a non-illustrated left outer side lighting device is installed at the vehicle width direction outer side of the pillar garnish 28 on the left side.

In the first modified example, the non-illustrated right outer side lighting device is activated so as to cause an outward gaze guiding section 28A set at a position offset to the vehicle lower side of an upper end portion of the right side pillar garnish 28 to emit light from its surface. A region where light is emitted from the surface is for example a region corresponding to the height of the gaze of the occupant P3 sitting on the third seat 18. Moreover, the non-illustrated left outer side lighting device is activated so as to cause an outward gaze guiding section 28A set at a position offset to the vehicle lower side of an upper end portion of the left side pillar garnish 28 to emit light from its surface. A region where light is emitted from the surface is at substantially the same height as the corresponding region of the right side pillar garnish 28, and is for example a region corresponding to the height of the gaze of the occupant P4 sitting on the fourth seat 20.

Thus, in the first modified example, in cases in which the occupant P3 sitting on the third seat 18 has been determined by the ECU 30 not to have an interest in interacting with the other occupant P4, the right side outward gaze guiding section 28A is made brighter, such that the gaze of the occupant P3 is naturally directed toward the vehicle width direction outer side. Moreover, in cases in which the occupant P4 sitting on the fourth seat 20 has been determined by the ECU 30 not to have an interest in interacting with the other occupant P3, the left side outward gaze guiding section 28A is made brighter, such that the gaze of the occupant P4 is naturally directed toward the vehicle width direction outer side.

Note that a configuration may be applied in which right outer side lighting devices and left outer side lighting devices are installed to both the pillar garnishes 28 and the door trims 34. In such cases, both the pillar garnishes 28 and the door trims 34 may be caused to emit light from their surfaces.

In the first exemplary embodiment, the right outer side lighting device 52 and the left outer side lighting device 54 are installed at the vehicle width direction outer side of the respective door garnishes 34A. However, there is no limitation thereto. For example, the configuration of a second modified example illustrated in FIG. 7 may be adopted.

SECOND MODIFIED EXAMPLE

Figure 7:
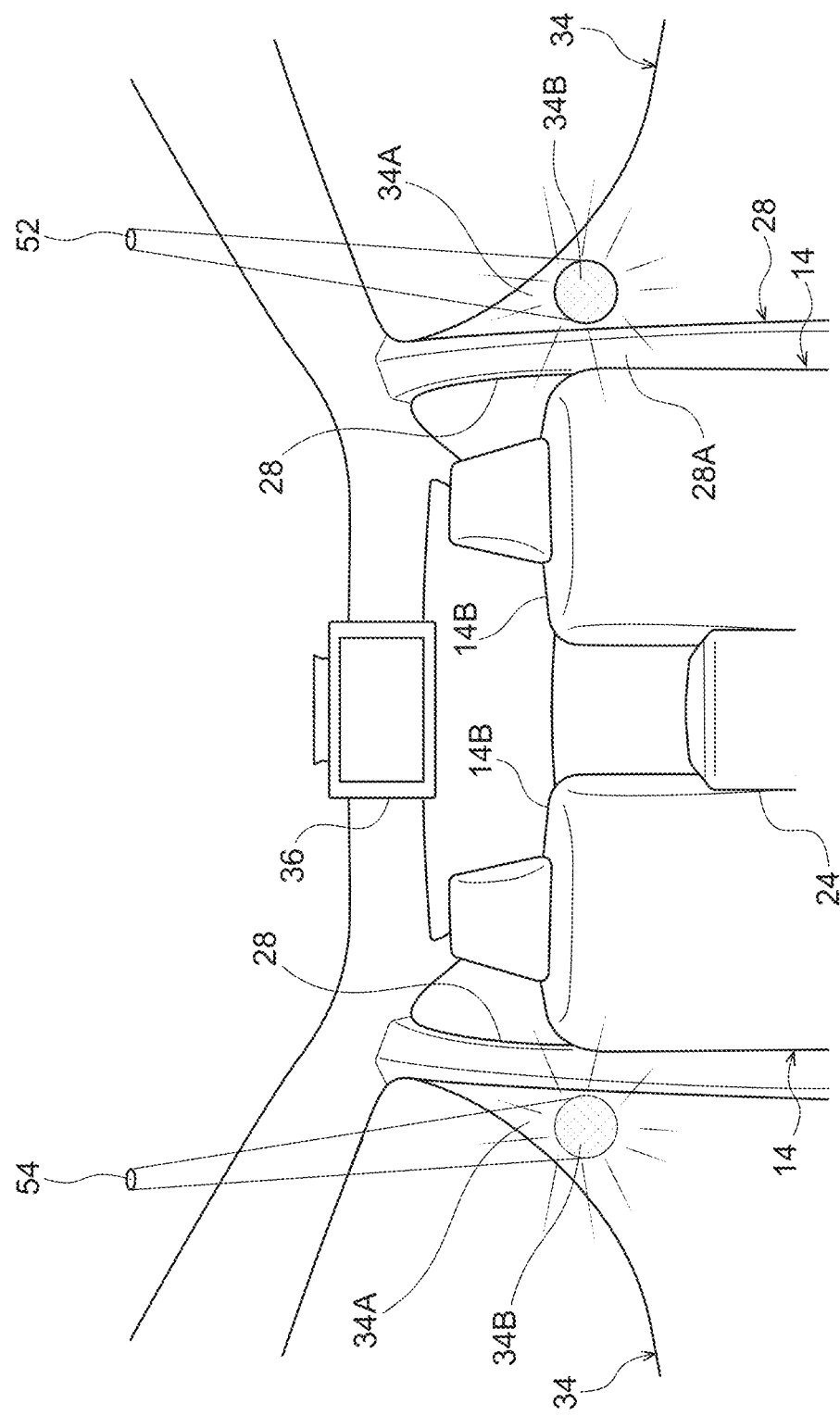
FIG. 7 is a diagram corresponding to FIG. 2, illustrating a second modified example of the vehicle in-cabin lighting system according to the first exemplary embodiment.

As illustrated in FIG. 7, in the second modified example, the right outer side lighting device 52 and the left outer side lighting device 54 are installed on the ceiling inside the vehicle cabin. The right outer side lighting device 52 is directed toward an upper portion of the door trim 34 on the right side. The left outer side lighting device 54 is directed toward an upper portion of the door trim 34 on the left side.

In cases in which the occupant P3 sitting on the third seat 18 has been determined by the ECU 30 not to have an interest in interacting with the other occupant P4, the right outer side lighting device 52 is activated. The substantially circular door garnish 34A set at the upper portion of the corresponding door trim 34 is thereby lit up by the right outer side lighting device 52 so as to become brighter than its surroundings. The gaze of the occupant P3 is thereby naturally directed toward the vehicle width direction outer side.

On the other hand, in cases in which the occupant P4 sitting on the fourth seat 20 has been determined by the ECU 30 not to have an interest in interacting with the other occupant P3, the left outer side lighting device 54 is activated. The substantially circular door garnish 34A set at the upper portion of the corresponding door trim 34 is thereby lit up by the left outer side lighting device 54 so as to become brighter than its surroundings. The gaze of the occupant P4 is thereby naturally directed toward the vehicle width direction outer side.

Note that in the second modified example, a configuration may be applied in which the right outer side lighting device 52 and the left outer side lighting device 54 are directed toward both the door trims 34 and the pillar garnishes 28. In such cases, both the pillar garnishes 28 and the door trims 34 are lit up. The right outer side lighting device 52 and the left outer side lighting device 54 may also have a reading lamp function. In such cases, the ECU 30 may make at least one of the door trim 34 or the pillar garnish 28 become brighter by changing the beam direction of the corresponding reading lamp. A dedicated lighting device to guide the gaze of the occupant toward the vehicle width direction outer side is therefore not required.

Second Exemplary Embodiment

Next, explanation follows regarding a vehicle in-cabin lighting system 70 according to a second exemplary embodiment of the present disclosure, with reference to FIG. 8 to FIG. 13. Note that configurations similar to those of the first exemplary embodiment are allocated the same reference numerals, and explanation thereof is omitted.

Figure 8:
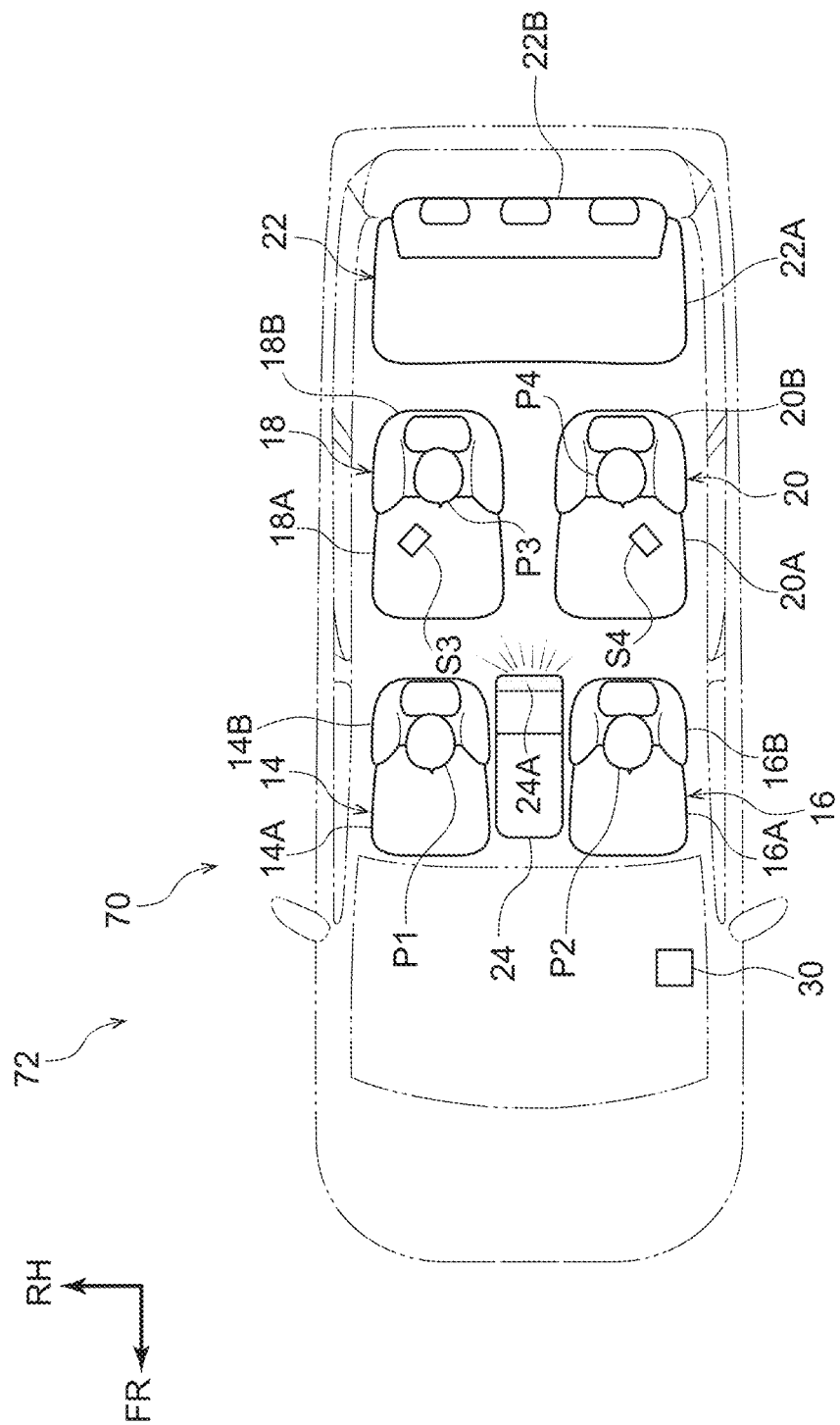
FIG. 8 is a schematic plan view illustrating relevant portions of a vehicle applied with a vehicle in-cabin lighting system according to a second exemplary embodiment.
Figure 9:
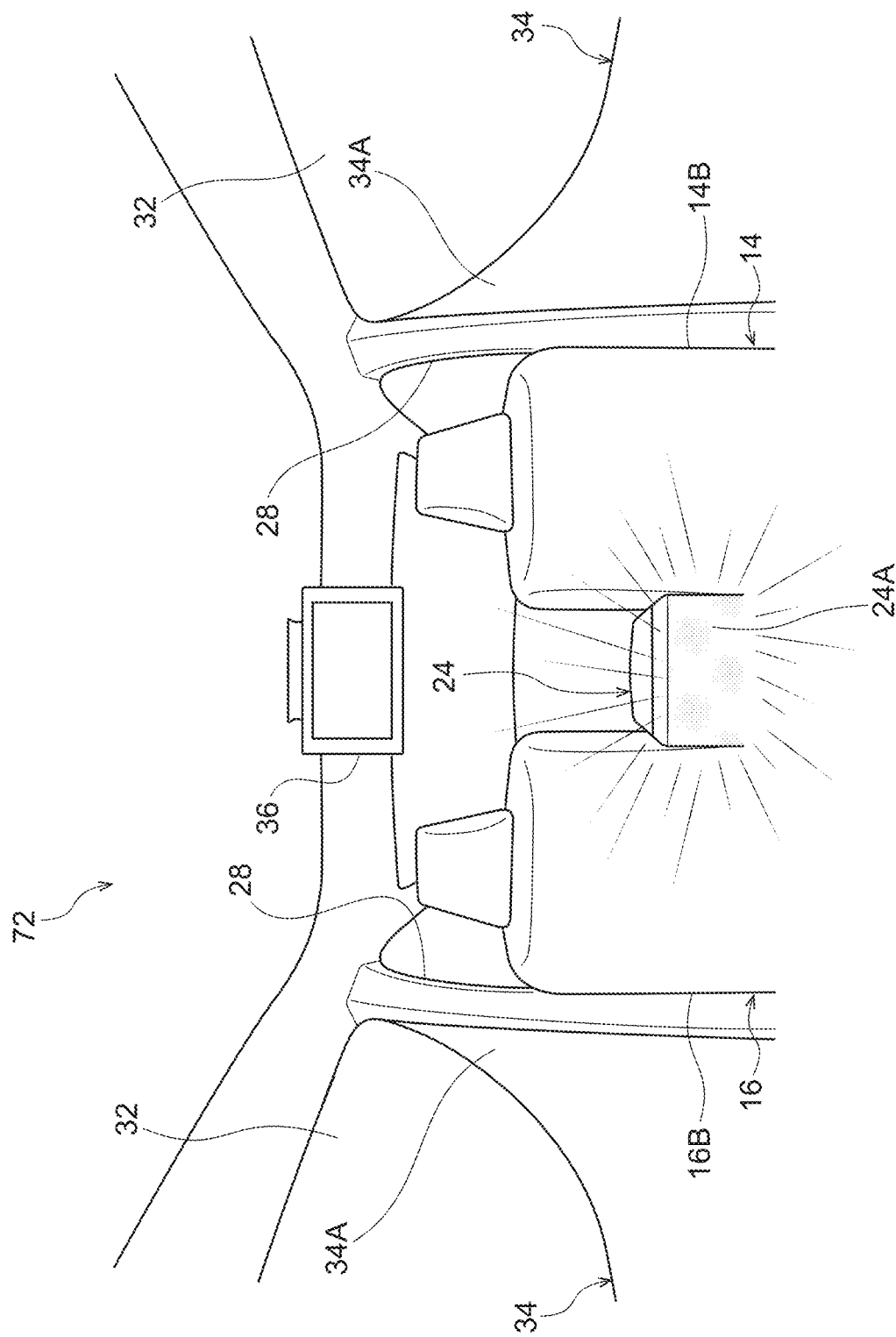
FIG. 9 is a diagram of a vehicle cabin inside of the vehicle of the second exemplary embodiment as viewed from a vehicle rear side.

As illustrated in FIG. 8 and FIG. 9, in a vehicle 72 applied with the vehicle in-cabin lighting system 70 according to the second exemplary embodiment, the center console 24 is disposed between the first seat 14 and the second seat 16. In the second exemplary embodiment, an inward gaze guiding section 24A is set in a rear face of the center console 24.

The inward gaze guiding section 24A is provided at the vehicle front side and vehicle width direction inner side of the third seat 18 and the fourth seat 20. An inner side lighting device 74 (see FIG. 10) is activated to make the inward gaze guiding section 24A brighter than its surroundings. As an example, the configuration of the second exemplary embodiment enables the occupant P3 sitting on the third seat 18 and the occupant P4 sitting on the fourth seat 20 to pass the time in comfort.

Hardware Configuration of Vehicle In-Cabin Lighting System 70

Figure 10:
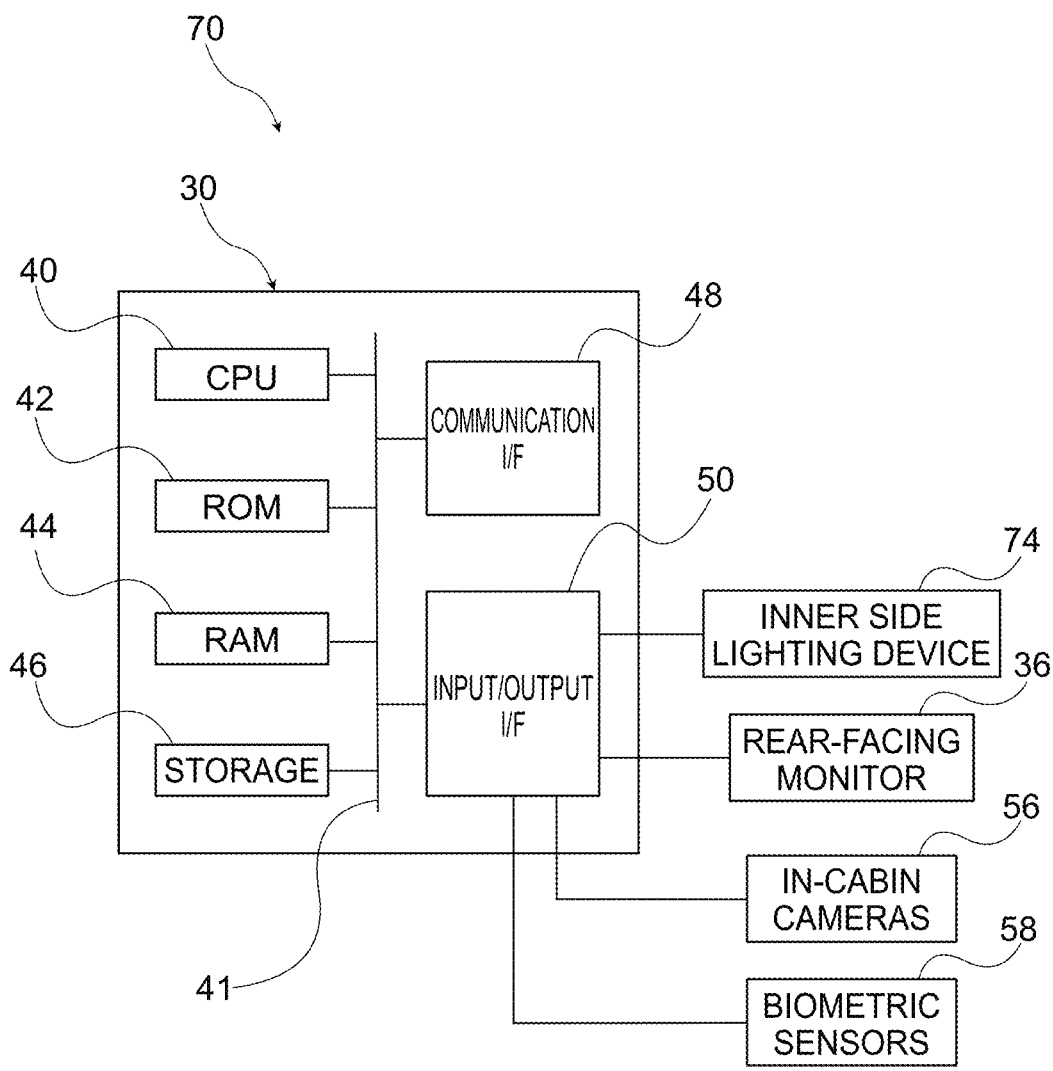
FIG. 10 is a block diagram illustrating a hardware configuration of the vehicle in-cabin lighting system according to the second exemplary embodiment.

FIG. 10 is a block diagram illustrating a hardware configuration of the vehicle in-cabin lighting system 70. As illustrated in FIG. 10, an ECU 30 of the vehicle in-cabin lighting system 70 includes a CPU 40, ROM 42, RAM 44, storage 46, a communication interface 48, and an input/output interface 50.

The inner side lighting device 74, the rear-facing monitor 36, the in-cabin cameras 56, and the biometric sensors 58 are each connected to the input/output interface 50. The inner side lighting device 74 of the present exemplary embodiment is installed inside the center console 24 and lights up when activated. Note that there is no particular limitation to light-up patterns of the inner side lighting device 74. For example, the inner side lighting device 74 might light up so as to turn on and off repeatedly (i.e. so as to flash). Alternatively, the inward gaze guiding section 24A may light up locally so as to create a visual pattern that changes over time. Moreover, the brightness and color of the inner side lighting device 74 may be configured so as to change over time.

Functional Configuration of Vehicle In-Cabin Lighting System 70

Various functionality of the vehicle in-cabin lighting system 70 is implemented using the hardware resources described above. Explanation follows regarding functional configurations implemented by the vehicle in-cabin lighting system 70, with reference to FIG. 11.

Figure 11:
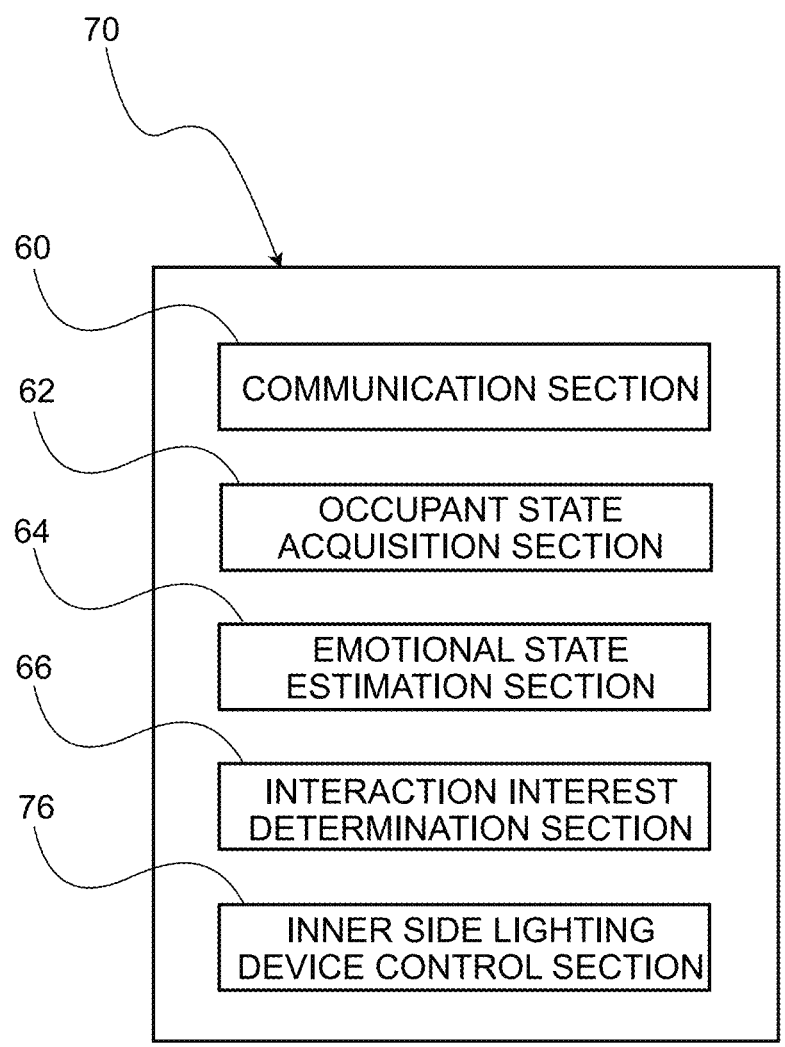
FIG. 11 is a block diagram illustrating functional configuration of the vehicle in-cabin lighting system according to the second exemplary embodiment.

As illustrated in FIG. 11, functional configuration of the vehicle in-cabin lighting system 70 includes a communication section 60, an occupant state acquisition section 62, an emotional state estimation section 64, an interaction interest determination section 66, and an inner side lighting device control section 76. Note that this functional configuration is implemented by the CPU 40 reading and executing a program stored in the ROM 42 or the storage 46.

The occupant state acquisition section 62 acquires states of the occupant P3 and the occupant P4 by receiving data from the in-cabin cameras 56 and the biometric sensors 58, similarly to in the first exemplary embodiment. The emotional state estimation section 64 estimates the emotional states of the occupant P3 and the occupant P4 based on the data received from the in-cabin cameras 56 and the biometric sensors 58.

The interaction interest determination section 66 determines whether or not the occupant P3 and the occupant P4 sitting on the third seat 18 and the fourth seat 20, and any occupant sitting on the fifth seat 22 has an interest in interacting with another occupant inside the vehicle cabin. Specifically, in cases in which the occupant P3 operates their portable terminal S3 so as to transmit a signal to the ECU 30, the interaction interest determination section 66 determines whether or not the occupant P3 has an interest in interacting with the other occupant P4, based on the received signal. In cases in which the occupant P4 operates their portable terminal S4 so as to transmit a signal to the ECU 30, the interaction interest determination section 66 determines whether or not the occupant P4 has an interest in interacting with the other occupant P3, based on the received signal. For example, in a case in which the occupant P3 sitting on the third seat 18 in FIG. 8 operates their portable terminal S3 to transmit a signal to the ECU 30 to indicate that they wish to engage with the other occupant P4, the interaction interest determination section 66 determines that the occupant P3 has an interest in interacting with the other occupant P4.

Even in cases in which neither the portable terminal S3 nor the portable terminal S4 has been operated, the interaction interest determination section 66 determines whether or not there is an interest in interacting with the other occupant based on signals from the occupant state acquisition section 62 and the emotional state estimation section 64. For example, the ECU 30 measures the length of time for which the gaze of the occupant P3 is directed toward the occupant P4 within a predetermined timeframe based on the image data of the occupant P3 captured by the in-cabin cameras 56. In cases in which the gaze of the occupant P3 is directed toward the occupant P4 for a long time, the interaction interest determination section 66 determines that the occupant P3 has an interest in interacting with the other occupant P4.

Alternatively, for example, the interaction interest determination section 66 may determine that the occupant P3 has an interest in interacting with the other occupant P4 in cases in which the occupant P3 has been estimated to be in a relaxed state by the functionality of the emotional state estimation section 64, based on time series data regarding heartrate fluctuations of the occupant P3.

In cases in which the occupant P3 has been determined to have an interest in interacting with the other occupant P4 by the functionality of the interaction interest determination section 66, the inner side lighting device control section 76 activates the inner side lighting device 74 so as to make the inward gaze guiding section 24A brighter. Thus the gaze of the occupant P3 is naturally directed toward the inward gaze guiding section 24A at the vehicle width direction inner side, such that a space that makes it easier for the occupant P3 to acknowledge the occupant P4 and also makes it easier for the occupant P4 to acknowledge the occupant P3 is established.

Operation

Next, explanation follows regarding operation of the present exemplary embodiment.

Lighting Control Processing

Figure 12:
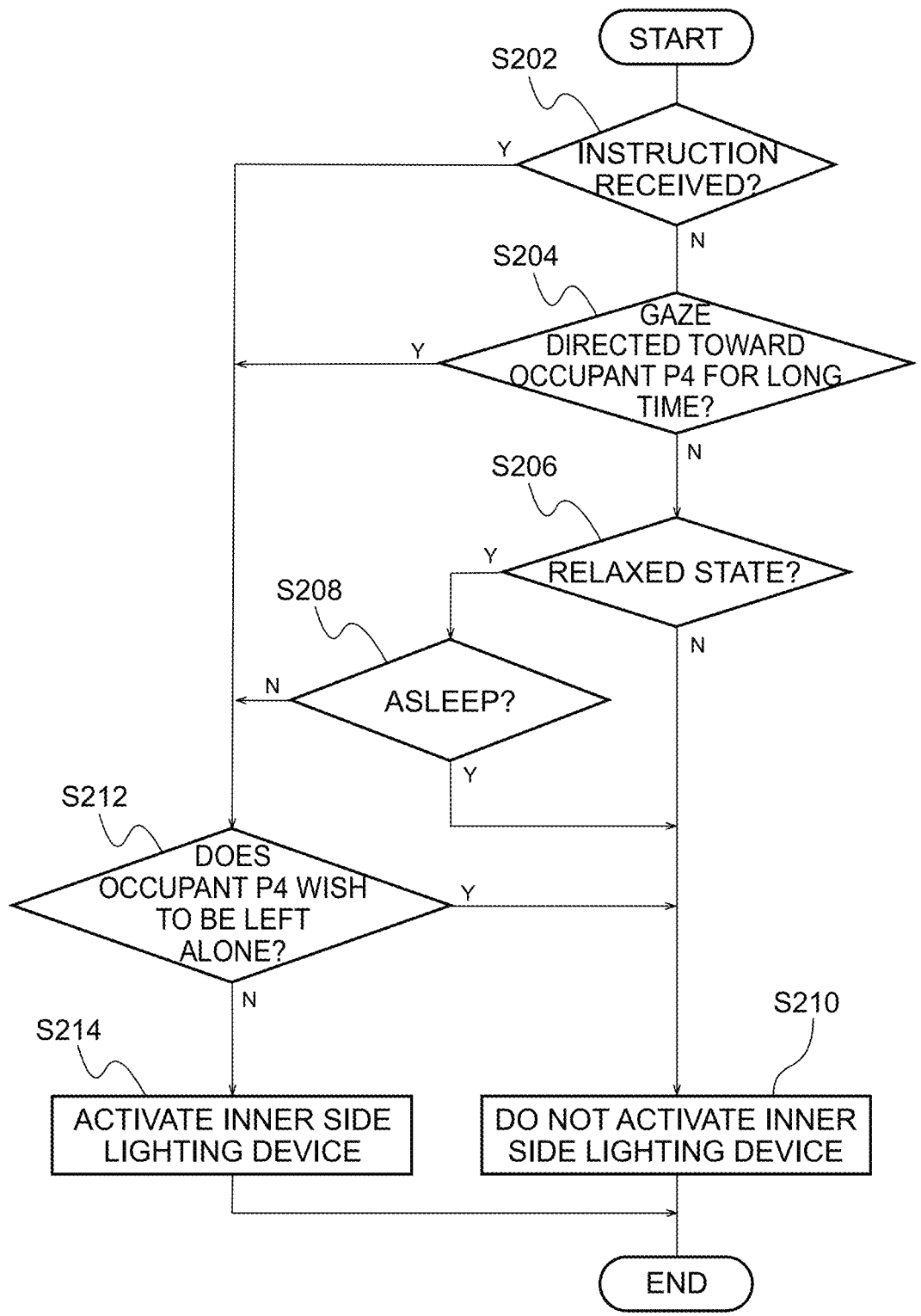
FIG. 12 is a flowchart illustrating an example of a flow of lighting control processing in the second exemplary embodiment.

Explanation follows regarding an example of the lighting control processing to control the inner side lighting device 74, with reference to the flowchart illustrated in FIG. 12. This lighting control processing is executed by the CPU 40 reading the program from the ROM 42 or the storage 46, and expanding and executing the program in the RAM 44. Note that although in the following explanation an example is described in which the processing is executed for the occupant P3 sitting on the third seat 18, processing would be executed similarly for the occupant P4 sitting on the fourth seat 20.

As illustrated in FIG. 12, at step S202, the CPU 40 determines whether or not an instruction has been received from the occupant P3. Specifically, the CPU 40 uses the functionality of the communication section 60 (see FIG. 11) to determine whether or not an instruction has been received as a result of the occupant P3 operating the portable terminal S3. The instruction referred to here is an instruction indicating that the occupant wishes to engage with the other occupant P4. In cases in which any other instruction has been transmitted, the CPU 40 determines that an instruction has not been received at step S202.

In cases in which the CPU 40 has determined that an instruction indicating that the occupant P3 wishes to engage with the other occupant P4 has been received from the occupant P3 at step S202, processing transitions to step S212. In cases in which the CPU 40 has determined that an instructing indicating that the occupant P3 wishes to engage with the other occupant P4 has not been received from the occupant P3 at step S202, processing transitions to step S204. Note that the processing of step S204 is described first, and the processing of step S212 will be described later.

At step S204, the CPU 40 determines whether or not the occupant P3 has been directing their gaze toward the occupant P4 for a long time. Specifically, the CPU 40 uses the functionality of the occupant state acquisition section 62 (see FIG. 11) to measure the total time for which the occupant P3 has directed their gaze toward the occupant P4 during the predetermined timeframe based on the image data of the occupant P3 captured by the in-cabin cameras 56. For example, in cases in which the total time for which the occupant P3 has directed their gaze toward the occupant P4 during the predetermined timeframe is greater than a predetermined proportion of the predetermined timeframe, the CPU 40 determines that the occupant P3 has been directing their gaze toward the occupant P4 for a long time.

In cases in which the CPU 40 has determined that the occupant P3 has been directing their gaze toward the occupant P4 for a long time at step S204, processing transitions to step S212. In cases in which the CPU 40 has determined that the occupant P3 has not been directing their gaze toward the occupant P4 for a long time at step S204 (namely for a short time), processing transitions to step S206. The processing of step S206 is described first, and the processing of step S212 will be described later.

At step S206, the CPU 40 determines whether or not the occupant P3 is in a relaxed state. Specifically, the CPU 40 uses the functionality of the occupant state acquisition section 62 (see FIG. 11) to estimate whether the occupant P3 is in a stressed state or in a relaxed state based on the time series data regarding heartrate fluctuations. In cases in which the CPU 40 has determined that the occupant P3 is in a relaxed state, processing transitions to step S208. In cases in which the CPU 40 has determined that the occupant P3 is not in a relaxed state, processing transitions to step S210.

At step S208, the CPU 40 determines whether or not the occupant P3 is asleep. Specifically, the CPU 40 uses the functionality of the occupant state acquisition section 62 (see FIG. 11) to determine that the occupant P3 is asleep in cases in which the eyes of the occupant P3 have been closed for a predetermined timeframe or greater, based on image data captured by the in-cabin cameras 56. In addition to using the image data captured by the in-cabin cameras 56, the CPU 40 may also determine that the occupant P3 is asleep in cases in which the alertness level of the occupant P3 is low, based on the heartrate signal for the occupant P3 acquired by the biometric sensors 58.

In cases in which the CPU 40 has determined that the occupant P3 is asleep at step S208, processing transitions to step S210. In cases in which the CPU 40 has determined that the occupant P3 is not asleep at step S208, processing transitions to step S212.

At step S210, the CPU 40 does not activate the inner side lighting device 74. Namely, the lighting control processing is ended without causing the inward gaze guiding section 24A to emit light from its surface. Note that in cases in which the inner side lighting device 74 is already in an activated state, activation of the inner side lighting device 74 is stopped such that the inward gaze guiding section 24A is extinguished, and the lighting control processing is then ended.

On the other hand, processing transitions to step S212 in cases in which the CPU 40 has determined that an instruction indicating that the occupant P3 wishes to engage with the other occupant P4 has been received from the occupant P3 at step S202, in cases in which the CPU 40 has determined that the occupant P3 has been directing their gaze toward the occupant P4 for a long time at step S204, and also in cases in which the CPU 40 has determined that the occupant P3 is not asleep at step S208.

At step S212, determination is made as to whether or not the occupant P4 wishes to be left alone. Specifically, the CPU 40 uses the functionality of the communication section 60 (see FIG. 11) to determine that the occupant P4 wishes to be left alone in cases in which an instruction indicating that the occupant P4 wishes to be left alone has been received from the occupant P4, and processing transitions to step S210. The CPU 40 also determines that the occupant P4 wishes to be left alone in cases in which the total time for which the occupant P4 has directed their gaze toward the vehicle exterior during a predetermined timeframe is greater than a predetermined proportion of the predetermined timeframe, and processing transitions to step S210.

On the other hand, in cases in which the CPU 40 has not determined that the occupant P4 wishes to be left alone, processing transitions to step S214 and the inner side lighting device 74 is activated. Thus, the inward gaze guiding section 24A positioned at the vehicle width direction inner side of the third seat 18 and the fourth seat 20 on which the occupant P3 and the occupant P4 are sitting is made brighter than its surroundings. The CPU 40 then ends the lighting control processing.

In cases in which plural occupants are sitting on the fifth seat 22, the CPU 40 executes similar lighting control processing.

As described above, in the vehicle in-cabin lighting system 70 according to the second exemplary embodiment, the inner side lighting device 74 is activated so as to cause the inward gaze guiding section 24A to be made brighter than its surroundings in cases in which the CPU 40 has determined that the occupant P3 does have an interest in interacting with the other occupant P4. This enables the gaze of the occupant P3 to be directed naturally toward the vehicle width direction inner side, namely in a direction toward where the other occupant P4 is sitting, thereby enabling a space conducive to communication to be established.

Moreover, the need to provide a mechanism such as a seat rotation mechanism to the vehicle seats in order to mechanically rotate the vehicle seats is eliminated. This enables costs and weight to be reduced compared to structures including a seat rotation mechanism. Other operation is similar to that of the first exemplary embodiment.

In the second exemplary embodiment, the inner side lighting device 74 is installed inside the center console 24. However, there is no limitation thereto. For example, the configuration of a modified example illustrated in FIG. 13 may be adopted.

MODIFIED EXAMPLE

Figure 13:
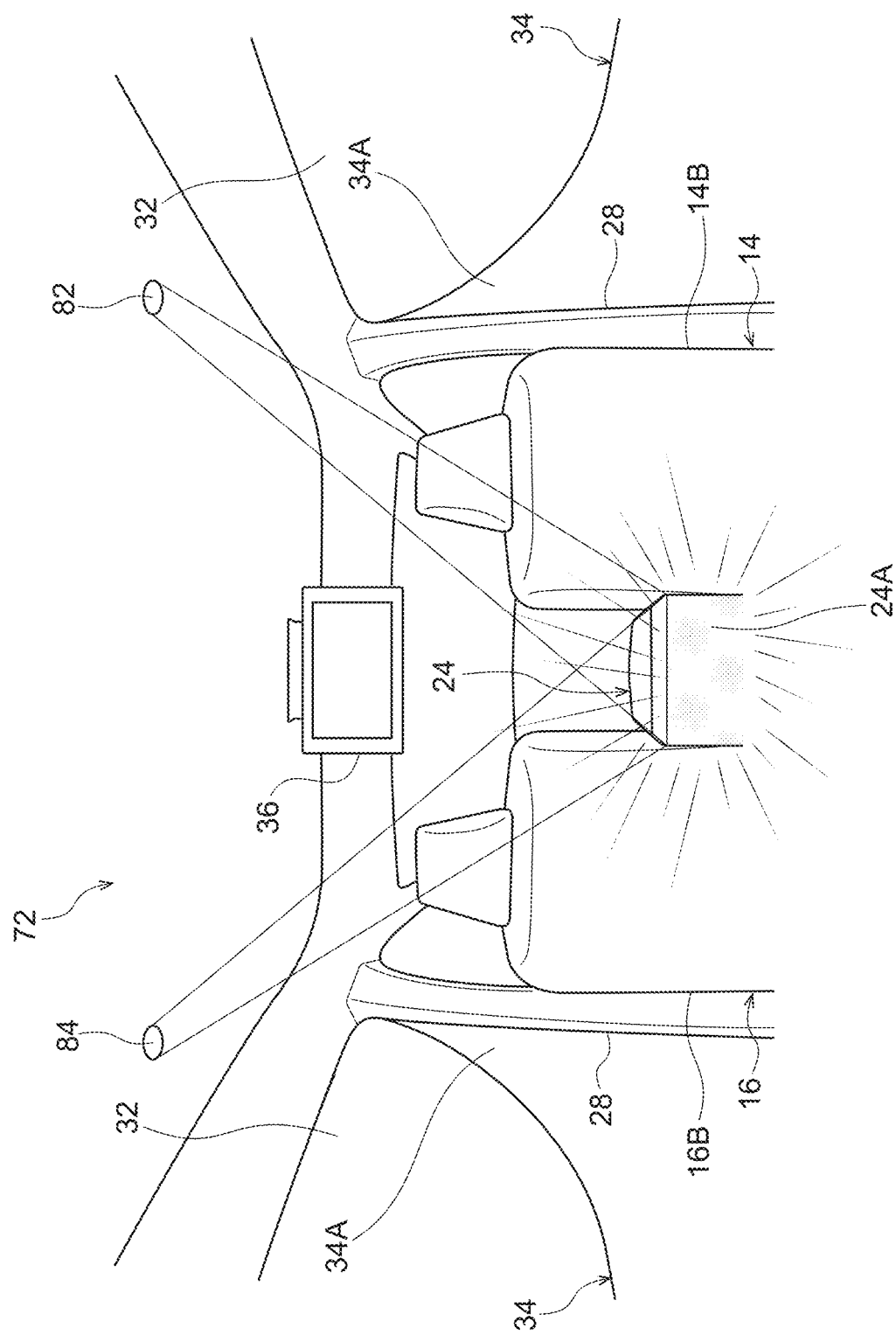
FIG. 13 is a diagram corresponding to FIG. 9, illustrating a modified example of the vehicle in-cabin lighting system according to the second exemplary embodiment.

As illustrated in FIG. 13, in the present modified example, a right inner side lighting device 82 and a left inner side lighting device 84 are installed on the ceiling inside the vehicle cabin. The right inner side lighting device 82 and the left inner side lighting device 84 are directed toward the inward gaze guiding section 24A set in the rear face of the center console 24.

In cases in which the occupant P3 sitting on the third seat 18 has been determined by the ECU 30 to have an interest in interacting with the other occupant P4, the right inner side lighting device 82 and the left inner side lighting device 84 are activated. The inward gaze guiding section 24A is thereby lit up by the right inner side lighting device 82 and the left inner side lighting device 84 so as to become brighter than its surroundings. The gaze of the occupant P3 is thereby naturally directed toward the vehicle width direction inner side.

In the present modified example, the right inner side lighting device 82 and the left inner side lighting device 84 may also have a reading lamp function. In such cases, the ECU 30 may make the inward gaze guiding section 24A become brighter by changing the beam directions of the reading lamps. A dedicated lighting device to guide the gazes of the occupants toward the vehicle width direction inner side is therefore not required.

In the present modified example, video may be projected onto the inward gaze guiding section 24A from the right inner side lighting device 82 and the left inner side lighting device 84. For example, projecting a video onto the inward gaze guiding section 24A using projection mapping technology enables the gazes of the occupant P3 and the occupant P4 to be more effectively guided. Furthermore, artificial mist may be generated in the vicinity of the inward gaze guiding section 24A, with a light being projected onto this mist to create an ethereal effect.

Although explanation has been given regarding the vehicle in-cabin lighting systems 10, 70 according to the first exemplary embodiment and the second exemplary embodiment, obviously various modifications may be implemented within a range not departing from the spirit of the present disclosure. For example, the first exemplary embodiment and the second exemplary embodiment may be combined. In such cases, providing the door garnishes 34A at the upper portions of the door trims 34 and providing the inward gaze guiding section 24A at the rear face of the center console 24 enables spaces to be established both in cases in which the occupant P3 and the occupant P4 wish to be left alone, and in cases in which the occupant P3 and the occupant P4 wish to pass the time in each other's company.

Moreover, in the vehicle in-cabin lighting systems 10, 70 of the first exemplary embodiment and the second exemplary embodiment described above, the present disclosure is applied to the vehicles 12, 72 with three rows of seats as an example. However, there is no limitation thereto. Namely, such vehicle in-cabin lighting systems may also be applied to vehicles with two rows of seats. Likewise, such vehicle in-cabin lighting systems may also be applied to a vehicle such as a bus in which four or more rows of vehicle seats are arranged along the vehicle front-rear direction.

Moreover, in the vehicle in-cabin lighting systems 10, 70 of the first exemplary embodiment and the second exemplary embodiment described above, the interaction interest determination section 66 determines an interest in interacting with another occupant based on signals from the occupant state acquisition section 62 and the emotional state estimation section 64. However, there is no limitation thereto. For example, interest in interacting with another occupant may be determined based on signals from either one of the occupant state acquisition section 62 or the emotional state estimation section 64. Alternatively, in addition to the occupant state acquisition section 62 and the emotional state estimation section 64, interest in interacting with another occupant may also be determined based on other conditions. For example, directional microphones may be provided to pick up the voices of occupants P1 to P4 inside the vehicle cabin of the vehicle 12, 72, and interest in interacting with another occupant may be determined based on signals acquired by these microphones. Specifically, the voice of the occupant P3 may be picked up by such a microphone when the occupant P3 starts speaking to the occupant P4, and the interaction interest determination section 66 may determine that the occupant P3 has an interest in interacting with the other occupant P4 based on the signal acquired by this microphone.

Moreover, in the vehicle in-cabin lighting system 10 of the first exemplary embodiment, the door garnishes 34A are only provided to the door trims 34 in the vicinity of the pillar garnishes 28 of the center pillars. However, there is no limitation thereto. For example, a separate outward gaze guiding section may be provided to a pillar garnish at a quarter pillar disposed further toward the vehicle rear than the center pillar. Making such an outward gaze guiding section brighter enables the gaze of an occupant sitting on the fifth seat 22 to be guided, thus enabling a space to be established in cases in which this occupant wishes to be left alone.

Moreover, a separate outward gaze guiding section may be provided to a pillar garnish of a front pillar disposed further toward the vehicle front than the center pillar. For example, in a vehicle equipped with autonomous driving functionality, making such an outward gaze guiding section brighter when operation by the occupant P1 is not required during autonomous driving enables the gaze of the occupant P1 sitting on the first seat 14 and the gaze of the occupant P2 sitting on the second seat 16 to be guided, enabling a space to be established in cases in which these occupants wish to be left alone.

Moreover, in the vehicle in-cabin lighting system 70 of the second exemplary embodiment, the rear face of the center console 24 is made brighter. However, there is no limitation thereto. For example, in a configuration in which the first seat 14 is provided with armrests, an armrest on the left side of the first seat 14 may be made to emit light from its surface so as to become brighter. Similarly, an armrest on the right side of the second seat 16 may be made to emit light from its surface so as to become brighter.

Moreover, in the vehicle in-cabin lighting system 70 of the second exemplary embodiment, the rear face of the center console 24 configures the inward gaze guiding section 24A, and the inward gaze guiding section 24A is made brighter so as to guide the gazes of the occupant P3 of the third seat 18 and the occupant P4 of the fourth seat 20 toward the vehicle width direction inner side. However, there is no limitation thereto. For example, the rear-facing monitor 36 may be employed to guide the gazes of the occupant P3 and the occupant P4. In such cases, a backlight of the rear-facing monitor 36 corresponds to an "inner side lighting device" of the present disclosure. Moreover, in cases in which the occupant P3 has been determined to have an interest in interacting with the other occupant P4 by the functionality of the interaction interest determination section 66 (see FIG. 11) in the vehicle in-cabin lighting system 70, the functionality of the inner side lighting device control section 76 may be used to activate such an inner side lighting device to make the rear-facing monitor 36 brighter than its surroundings.

The gazes of the occupant P3 and the occupant P4 are thus guided naturally toward the vehicle width direction inner side.

The lighting control processing executed by the CPU 40 reading software (a program) in the exemplary embodiments described above may be executed by various types of processor other than the CPU 40. Such processors include programmable logic devices (PLDs) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The lighting control processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Although various data is stored in the storage 46 in the exemplary embodiments described above, there is no limitation thereto. For example, a storage section may be configured by a storage medium such as a compact disc (CD), digital versatile disc (DVD), or universal serial bus (USB) memory. In such cases, various programs, data, and the like are held on the storage medium.

What is claimed is:

1. A vehicle in-cabin lighting system comprising:
an outward gaze guiding section that is provided inside a vehicle cabin at a vehicle front side and at a vehicle width direction outer side of a vehicle seat, and that becomes brighter than its surroundings on activation of an outer side lighting device;
a memory; and
a processor coupled to the memory and configured to:
determine whether or not an occupant sitting on the vehicle seat has an interest in interacting with another occupant inside the vehicle cabin based on detection of operation of an operation section by the occupant or based on detection of a state of the occupant, and
activate the outer side lighting device so as to make the outward gaze guiding section brighter in a case in which determination is made that there is no interest in interacting, wherein:
the outward gaze guiding section comprises at least one of a pillar garnish or a door garnish;
the outer side lighting device is installed at the vehicle width direction outer side of at least one of the pillar garnish or the door garnish; and
the processor is configured to activate the outer side lighting device so that light is emitted from the at least one of the pillar garnish or the door garnish.

2. The vehicle in-cabin lighting system of any one of claim 1, wherein the processor is configured to:
estimate an emotional state of the occupant sitting on the vehicle seat and output a signal indicating the estimated emotional state; and
determine whether or not the occupant sitting on the vehicle seat has an interest in interacting with the other occupant based on the output signal.

3. The vehicle in-cabin lighting system of claim 1, further comprising:
an inward gaze guiding section that is provided inside the vehicle cabin at the vehicle front side and at a vehicle width direction inner side of the vehicle seat, and that becomes brighter than its surroundings on activation of an inner side lighting device, wherein the processor is configured to:

determine whether or not the occupant sitting on the vehicle seat has an interest in interacting with another occupant inside the vehicle cabin based on detection of operation of the operation section by the occupant or based on detection of a state of the occupant, activate the outer side lighting device so as to make the outward gaze guiding section brighter in a case in which determination is made that there is no interest in interacting, and activate the inner side lighting device so as to make the inward gaze guiding section brighter in a case in which determination is made that there is an interest in interacting.

4. The vehicle in-cabin lighting system of claim 1, wherein the processor is further configured to determine whether the occupant has an interest in interacting with the another occupant based on a state of the occupant acquired from at least one of:

image data of the occupant obtained by a camera in a vehicle cable, fluctuations in a heartrate of the occupant from a biometric sensor, fluctuations in respiration of the occupant obtained by a biometric sensor, or a signal from a portable terminal indicating an intention of the occupant.

5. The vehicle in-cabin lighting system of claim 1, wherein the processor is further configured to determine whether the occupant is asleep, and in response to a determination that the occupant is asleep, to deactivate the outer side lighting device.

6. The vehicle in-cabin lighting system of claim 1, wherein the processor is further configured to determine whether or not the occupant sitting on the vehicle seat has an interest in interacting with the another occupant inside the vehicle cabin based on blood pressure fluctuations and respiratory fluctuations.

7. A vehicle in-cabin lighting system comprising:

an inward gaze guiding section that is provided inside a vehicle cabin at a vehicle front side and at a vehicle width direction inner side of a vehicle seat, and that becomes brighter than its surroundings on activation of an inner side lighting device;

a memory; and a processor coupled to the memory and configured to:

determine whether or not an occupant sitting on the vehicle seat has an interest in interacting with another occupant inside the vehicle cabin based on detection of operation of an operation section by the occupant or based on detection of a state of the occupant, and activate the inner side lighting device so as to make the inward gaze guiding section brighter in a case in which determination is made that there is an interest in interacting wherein the inward gaze guiding section comprises at least one of a front seat armrest or a center console;

the inner side lighting device is installed inside at least one of the front seat armrest or the center console; and the processor is configured to activate the inner side lighting device so that light is emitted from the at least one of the armrest or the center console.

8. The vehicle in-cabin lighting system of claim 7, wherein:

the inner side lighting device is a reading lamp configured to shine light directly in front of an occupant; and the processor is configured to make the at least one of the armrest or the center console brighter by changing a lighting direction of the reading lamp.

9. A method for actuating a vehicle in-cabin lighting system provided inside a vehicle cabin and comprising a gaze guiding section that becomes brighter than its surroundings on activation of a lighting device, the method comprising:

determining whether or not an occupant sitting on a vehicle seat has an interest in interacting with another occupant inside the vehicle cabin based on detection of operation of an operation section by the occupant or based on detection of a state of the occupant; and activating the lighting device so as to make the gaze guiding section emitting light from a pillar garnish or a door garnish brighter based on the determined presence or absence of interest in interacting with the other occupant.

10. The method of claim 9, wherein:

the gaze guiding section comprises an outward gaze guiding section provided at a vehicle front side and a vehicle width direction outer side of the vehicle seat, and the lighting device comprises an outer side lighting device that makes the outward gaze guiding section brighter, the method further comprising activating the outer side lighting device so as to make the outward gaze guiding section brighter in a case in which the occupant sitting on the vehicle seat has been determined not to have an interest in interacting with the other occupant.

11. The method system of claim 9, wherein determining whether or not the occupant sitting on the vehicle seat has an interest in interacting with the another occupant inside the vehicle cabin further based on blood pressure fluctuations and respiratory fluctuations.

12. A non-transitory storage medium storing a program that causes a computer to execute processing to actuate a vehicle in-cabin lighting system provided inside a vehicle cabin, the system comprising a gaze guiding section that becomes brighter than its surroundings on activation of a lighting device, the processing comprising:

determining whether or not an occupant sitting on a vehicle seat has an interest in interacting with another occupant inside the vehicle cabin based on detection of operation of an operation section by the occupant or based on detection of a state of the occupant; and activating the lighting device so as to make the gaze guiding section emitting light from a pillar garnish or a door garnish brighter based on the determined presence or absence of interest in interacting with the other occupant.

13. The storage medium of claim 12, wherein:

the gaze guiding section comprises an outward gaze guiding section provided at a vehicle front side and a vehicle width direction outer side of the vehicle seat, and the lighting device comprises an outer side lighting device that makes the outward gaze guiding section brighter, the processing further comprising activating the outer side lighting device so as to make the outward gaze guiding section brighter in a case in which the occupant sitting on the vehicle seat has been determined not to have an interest in interacting with the other occupant.

14. The storage medium of claim 12, wherein determining whether or not the occupant sitting on the vehicle seat has an interest in interacting with the another occupant inside the vehicle cabin further based on blood pressure fluctuations and respiratory fluctuations.

\* \* \* \* \*